(12) United States Patent
Hatano et al.

(10) Patent No.: US 7,848,025 B2
(45) Date of Patent: Dec. 7, 2010

(54) TRANSPARENT ARTICLES PREPARED FROM THERMOPLASTIC COMPOSITIONS HAVING HIGH FLOW AND DUCTILITY, AND METHOD OF PREPARING ARTICLES

(75) Inventors: Akira Hatano, Utsunomiya (JP); Theodorus Lambertus Hoeks, Bergen op Zoom (NL); Dennis Karlik, Bergen op Zoom (NL); Ken Kuriki, Tochigi-ken (JP); Jon M. Malinoski, Evansville, IN (US); Sriramakrishna Maruvuda, Evansville, IN (US)

(73) Assignee: Sabic Innovative Plastics IP B.V. (NL)

( * ) Notice: Subject to any disclaimer, the term of this patent is extended or adjusted under 35 U.S.C. 154(b) by 23 days.

(21) Appl. No.: 12/347,060

(22) Filed: Dec. 31, 2008

(65) Prior Publication Data

US 2010/0168370 A1    Jul. 1, 2010

(51) Int. Cl.
*G02B 3/00* (2006.01)
*G02B 7/00* (2006.01)

(52) U.S. Cl. .................. 359/642; 359/109; 428/411.1; 428/412; 502/150; 528/176; 528/190; 528/193; 528/194; 528/271; 528/272

(58) Field of Classification Search ............... 359/109, 359/642; 428/411.1, 412; 502/150; 528/176, 528/190, 193, 194, 271, 272
See application file for complete search history.

(56) References Cited

U.S. PATENT DOCUMENTS

| | | | |
|---|---|---|---|
| 5,321,114 A | 6/1994 | Fontana et al. | |
| 6,436,503 B1 | 8/2002 | Cradic et al. | |
| 6,537,636 B1 | 3/2003 | Wisnudel et al. | |
| 6,630,221 B1 * | 10/2003 | Wong | 428/117 |
| 6,686,430 B1 | 2/2004 | Nagamune | |
| 2003/0120024 A1 | 6/2003 | Wehrmann et al. | |
| 2006/0264582 A1 | 11/2006 | Mullen et al. | |

FOREIGN PATENT DOCUMENTS

| | | |
|---|---|---|
| DE | 2701173 A1 | 7/1978 |
| EP | 1251371 | 10/2002 |
| EP | 1302785 | 4/2003 |
| EP | 1489123 A1 | 12/2004 |
| EP | 1808461 | 7/2007 |

OTHER PUBLICATIONS

ASTM D 1238-04, Standard Test Method for Melt Flow Rates of Thermoplastics by Extrusion Plastometer, published Dec. 1, 2004, 14 pages.
ASTM D 1003-00, Standard Test Method for Haze and Luminous Transmittance of Transparent Plastics, published Jul. 2000, 6 pages.
ASTM D 1925-70, Standard Test Method for Yellowness Index of Plastics, published Mar. 1970, 3 pages.
ISO 1133, Plastics-Determination of the melt mass-flow rate (MFR) and the melt volume-flow rate (MVR) of thermoplastics, Jun. 1, 2005, 20 pages.

* cited by examiner

*Primary Examiner*—Terressa M Boykin
(74) *Attorney, Agent, or Firm*—Cantor Colburn LLP

(57) ABSTRACT

Disclosed herein is a camera lens comprising a thermoplastic composition comprising a poly(aliphatic ester)-polycarbonate copolymer comprising soft block ester units derived from an alpha, omega $C_{6-20}$ aliphatic dicarboxylic acid or derivative thereof, a dihydroxyaromatic compound, and a carbonate source, wherein the thermoplastic composition has a melt volume rate of 13 to 25 cc/10 min at 250° C. and under a load of 1.2 Kg and a dwell time of 6 minutes, according to ASTM D1238-04, and wherein the camera lens has an effective lens area of 0.5 to 100 $mm^2$. A method of making the camera lens, and a camera lens comprising a thermoplastic composition comprising a redistribution product of a poly(aliphatic ester)-polycarbonate, are also disclosed.

24 Claims, 7 Drawing Sheets

TRANSPARENT ARTICLES PREPARED FROM THERMOPLASTIC COMPOSITIONS HAVING HIGH FLOW AND DUCTILITY, AND METHOD OF PREPARING ARTICLES

BACKGROUND OF THE INVENTION

This invention is directed to transparent articles prepared from thermoplastic compositions having high flow and ductility, and in particular to optical lenses prepared from thermoplastic compositions comprising a poly(aliphatic ester)-polycarbonate copolymer.

Miniaturization, functionality integration and weight reduction are emerging trends in portable hand-held electronics. These devices must withstand everyday usage over their lifetime, which can be up to several years. These trends call for plastic materials having enhanced flow properties with the ability to fill thinner wall designs, and excellent impact performance over a variety of usage environments (for example, physical shock due to dropping the item, and extremes of temperature and humidity).

The ability to take high quality pictures with devices such as mobile phone cameras or other portable handheld devices thus necessitates the need for materials, and in particular lens materials, with better properties. A camera embedded into any of these portable devices typically includes a complex optical system of a matched series of lenses, each of which has distinct optical characteristics, so that the resulting lens system as a whole has a variety of capabilities to meet consumer needs.

Polycarbonates, relative to other thermoplastics, are noted for their exceptional optical properties, thermal resistance, and mechanical properties such as impact strength. Currently, exemplary commercially available materials for the fabrication of such lenses or lens systems includes materials such as, for example, bisphenoxyethanol polyesters including OKP4 and OKP4-HT, available from Osaka Gas Chemicals Co, but which are prepared from expensive specialty feedstocks. However, high flow, optical quality polycarbonates remain the incumbent material of choice for lens materials due to their high optical and mechanical performance properties and low-cost, readily available feedstocks. However, as the lenses become smaller and smaller, and the quality requirements (e.g. picture size, quality) become more stringent, the performance of commercial optical quality polycarbonate is no longer adequate.

BRIEF SUMMARY OF THE INVENTION

There exists a need for polycarbonate materials having improved melt flow properties while retaining the desirable optical and mechanical properties. The above-described and other drawbacks are alleviated by, in an embodiment, a camera lens comprising a thermoplastic composition comprising a poly(aliphatic ester)-polycarbonate copolymer comprising soft block ester units derived from an alpha, omega $C_{6-20}$ aliphatic dicarboxylic acid or derivative thereof, a dihydroxyaromatic compound, and a carbonate source, wherein the thermoplastic composition has a melt volume rate of 13 to 25 cc/10 min at 250° C. and under a load of 1.2 Kg and a dwell time of 6 minutes, according to ASTM D1238-04, and wherein the camera lens has an effective lens area of 0.5 to 100 mm².

In another embodiment, an optical lens having a shaped surface, comprises a thermoplastic composition comprising a poly(aliphatic ester)-polycarbonate copolymer comprising soft block ester units of the formula (8a)

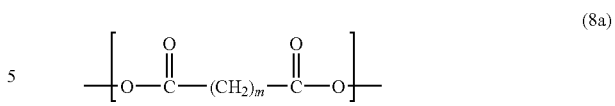

wherein m is 4 to 18; and optionally, a polycarbonate, wherein the thermoplastic composition has a melt volume rate of 13 cc/10 min to 25 cc/10 min at 250° C. and under a load of 1.2 Kg and a dwell time of 6 minutes, according to ASTM D1238-04, wherein an article molded from the thermoplastic composition and having a thickness of 3.2 mm has a haze of less than or equal to 1.0 percent, when measured according to ASTM D1003-00, and wherein the camera lens has an effective lens area of 0.5 to 100 mm².

In another embodiment, a method of making a camera lens, comprises molding a poly(aliphatic ester)-polycarbonate copolymer comprising soft block ester units derived from an alpha, omega $C_{6-20}$ aliphatic dicarboxylic acid or derivative thereof, a dihydroxyaromatic compound, and a carbonate source, wherein the thermoplastic composition has a melt volume rate of 13 to 25 cc/10 min at 250° C. and under a load of 1.2 Kg and a dwell time of 6 minutes, according to ASTM D1238-04, wherein the camera lens has an effective lens area of 0.5 to 100 mm², and wherein an optical lens prepared by the method has precision dimensions that deviate by less than 400 nm from a reference standard when measured by three dimensional contact profilometry.

In another embodiment, a camera lens comprises a thermoplastic composition, comprising a reaction product of a poly(aliphatic ester)-polycarbonate copolymer comprising 0.5 to 10 wt % soft block ester units derived from an alpha, omega $C_{6-20}$ aliphatic dicarboxylic acid or derivative thereof, a dihydroxyaromatic compound, and a carbonate source, with a redistribution catalyst, wherein the thermoplastic composition has a melt volume rate of 13 to 25 cc/10 min at 250° C. and under a load of 1.2 Kg and a dwell time of 4 minutes, according to ISO 1133, and wherein the camera lens has an effective lens area of 0.5 to 100 mm².

A description of the figures, which are meant to be exemplary and not limiting, is provided below.

Figure 1:
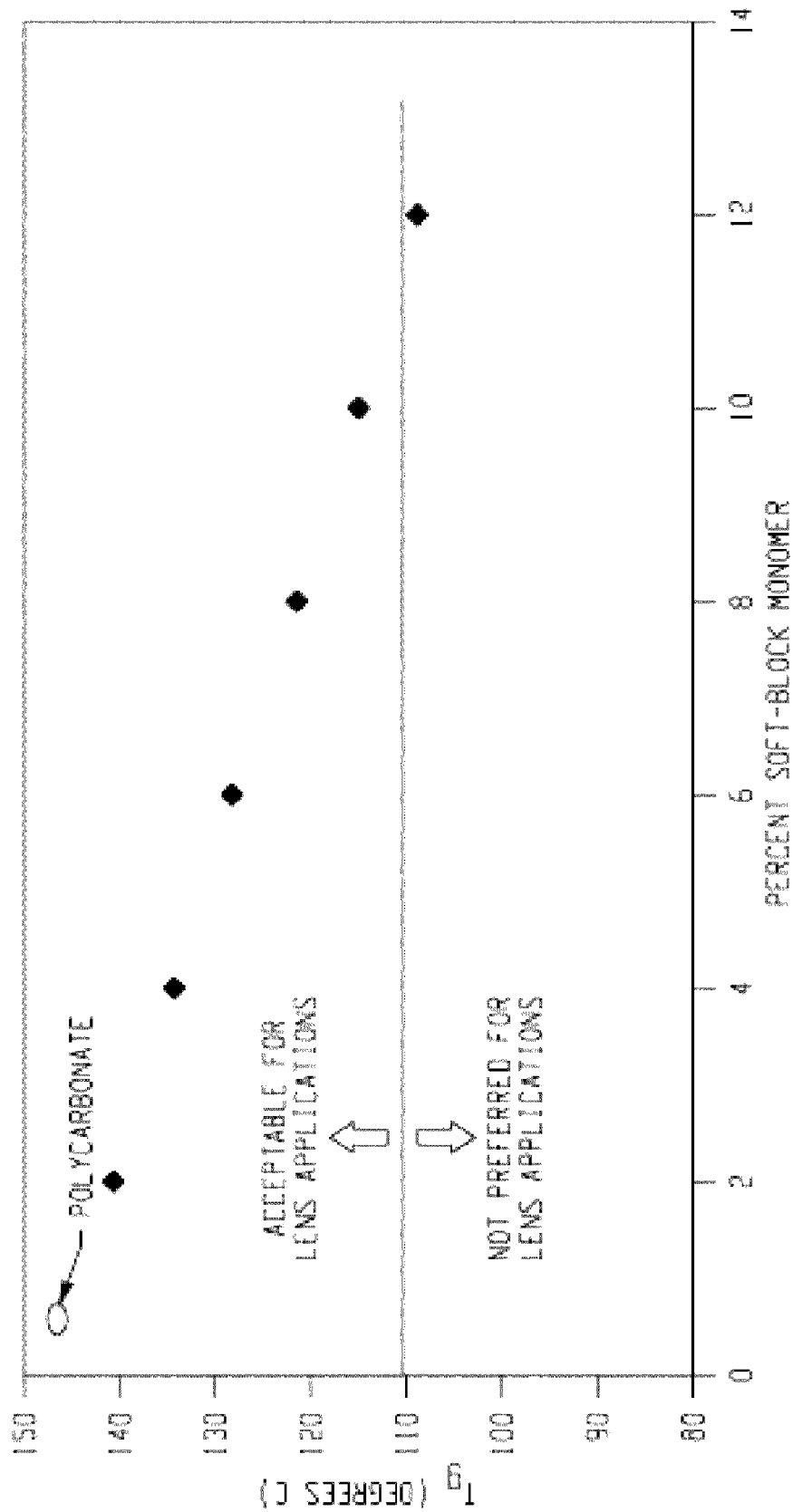
FIG. 1 is a plot of glass transition temperature versus percent soft block content for exemplary poly(aliphatic ester)-polycarbonates.

The above described and other features are exemplified by the following detailed description.

DETAILED DESCRIPTION OF THE INVENTION

Surprisingly, it has been found that a thermoplastic composition comprising a poly(aliphatic ester)-polycarbonate copolymer (also referred to herein as a polyester-polycarbonate having soft block units), provides excellent replication of curved surfaces when molded, which is necessary for optical lens applications. The thermoplastic composition exhibits a high degree of mold-filling suitable for preparing thin-wall articles, and desirably has excellent surface smoothness in the molded article with molding repeatability and excellent mold release characteristics. Also important for optical lens applications are the thermoplastic composition's excellent optical properties such as high transparency (i.e., high % transmission of 85% or more, and a low haze of less than 1%, measured on 3.2 mm plaques according to ASTM D1003-00), and low birefringence relative to standard optical-grade polycarbonates. The thermoplastic composition desirably has high melt flow (from 13 to 25 cubic centimeters per ten minutes (cc/10 min), measured under a load of 1.2 Kg and at a temperature of 250° C.), without sacrificing optical, mechanical, and surface finish properties.

Optical lenses prepared from the thermoplastic composition desirably have effective surface areas (defined as the usable surface area of the lens which permits the refracting of incident light) of 0.5 to 100 mm$^2$, and a lens thicknesses (measured through the center of the lens, parallel to the optical path of the least refracted incident light) of 0.25 mm to 2.5 mm. Optical lenses molded from the thermoplastic composition exhibit excellent mechanic properties, low birefringence, and excellent chemical and dimensional stability.

The thermoplastic composition from which the articles (e.g., optical lenses) herein are molded includes a poly(aliphatic ester)-polycarbonate. Generally, as used herein, the term or suffix "polycarbonate" means compositions having repeating structural carbonate units of the formula (1):

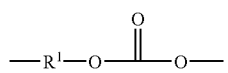

(1)

in which at least 60 percent of the total number of $R^1$ groups are aromatic organic radicals and the balance thereof are aliphatic, alicyclic, or aromatic radicals. In one embodiment, each $R^1$ is an aromatic organic radical, for example a radical of the formula (2):

$$-A^1-Y^1-A^2- \quad (2)$$

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O)$_2$—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

Polycarbonates may be produced by the reaction of dihydroxy compounds having the formula HO—$R^1$—OH, which includes dihydroxy compounds of formula (3):

$$HO-A^1-Y^1-A^2-OH \quad (3)$$

wherein $Y^1$, $A^1$ and $A^2$ are as described above. Also included are bisphenol compounds of general formula (4):

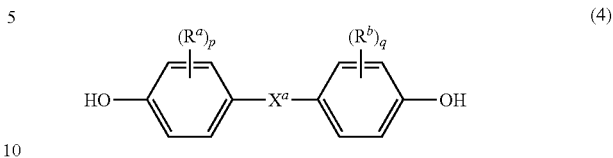

(4)

wherein $R^a$ and $R^b$ each represent a halogen atom or a monovalent hydrocarbon group and may be the same or different; p and q are each independently integers of 0 to 4; and $X^a$ represents one of the groups of formula (5):

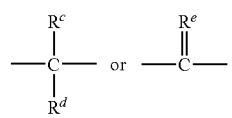

(5)

wherein $R^c$ and $R^d$ each independently represent a hydrogen atom or a monovalent linear or cyclic hydrocarbon group and $R^e$ is a divalent hydrocarbon group.

In an embodiment, a heteroatom-containing cyclic alkylidene group comprises at least one heteroatom with a valency of 2 or greater, and at least two carbon atoms. Heteroatoms for use in the heteroatom-containing cyclic alkylidene group include —O—, —S—, and —N(Z)—, where Z is a substituent group selected from hydrogen, hydroxy, $C_{1-12}$ alkyl, $C_{1-12}$ alkoxy, or $C_{1-12}$ acyl. Where present, the cyclic alkylidene group or heteroatom-containing cyclic alkylidene group may have 3 to 20 atoms, and may be a single saturated or unsaturated ring, or fused polycyclic ring system wherein the fused rings are saturated, unsaturated, or aromatic.

Other bisphenols containing substituted or unsubstituted cyclohexane units can be used, for example bisphenols of formula (6):

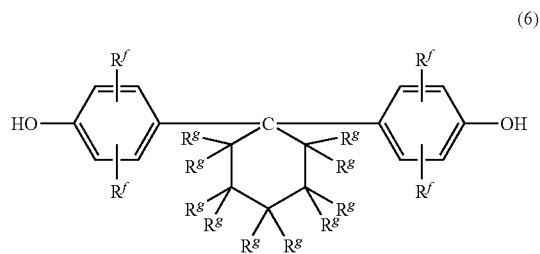

(6)

wherein each $R^f$ is independently hydrogen, $C_{1-12}$ alkyl, or halogen; and each $R^g$ is independently hydrogen or $C_{1-12}$ alkyl. The substituents may be aliphatic or aromatic, straight chain, cyclic, bicyclic, branched, saturated, or unsaturated. Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol containing polycarbonates, or a combination comprising at least one of the foregoing with other bisphenol polycarbonates, are supplied by Bayer Co. under the APEC® trade name.

Other useful dihydroxy compounds having the formula HO—R¹—OH include aromatic dihydroxy compounds of formula (7):

wherein each $R^h$ is independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and n is 0 to 4. The halogen is usually bromine.

Exemplary dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha'-bis(4-hydrokyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, and the like, as well as combinations comprising at least one of the foregoing dihydroxy compounds.

Specific examples of bisphenol compounds that may be represented by formula (3) include 1,1-bis(4-hydroxyphenyl) methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl) octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine (PPPBP), and 1,1-bis(4-hydroxy-3-methylphenyl)cyclohexane (DMBPC). Combinations comprising at least one of the foregoing dihydroxy compounds may also be used.

In addition to the polycarbonates described above, combinations of the polycarbonate with other thermoplastic polymers, for example combinations of homopolycarbonates and/or polycarbonate copolymers, may be used.

In a specific embodiment, where a polycarbonate is included, the polycarbonate may be a linear homopolymer derived from bisphenol A, in which each of $A^1$ and $A^2$ is p-phenylene and $Y^1$ is isopropylidene. The polycarbonates generally may have an intrinsic viscosity, as determined in chloroform at 25° C., of 0.3 to 1.5 deciliters per gram (dl/g), specifically 0.45 to 1.0 dl/g. The polycarbonates may have a weight average molecular weight (Mw) of 10,000 to 100,000 g/mol, as measured by gel permeation chromatography (GPC) using a crosslinked styrene-divinyl benzene column, at a sample concentration of 1 milligram per milliliter, and as calibrated with polycarbonate standards.

In an embodiment, a polycarbonate may have a melt volume flow rate (often abbreviated MVR) measures the rate of extrusion of a thermoplastics through an orifice at a prescribed temperature and load. Polycarbonates useful for the formation of articles may have an MVR, measured at 300° C. under a load of 1.2 kg according to ASTM D1238-04 or ISO 1133, of 0.5 to 80 cubic centimeters per 10 minutes (cc/10 min). In a specific embodiment, where a polycarbonate is used in addition to the poly(aliphatic ester)-polycarbonate, the polycarbonate (or a combination of polycarbonates, i.e., a polycarbonate composition) has an MVR measured at 300° C. under a load of 1.2 kg according to ASTM D1238-04 or ISO 1133, of 45 to 75 cc/10 min, specifically 50 to 70 cc/10 min, and more specifically 55 to 65 cc/10 min.

"Polycarbonates" and "polycarbonate resins" as used herein further include homopolycarbonates, copolymers comprising different $R^1$ moieties in the carbonate (referred to herein as "copolycarbonates"), copolymers comprising carbonate units and other types of polymer units, such as ester units, polysiloxane units, and combinations comprising at least one of homopolycarbonates and copolycarbonates. As used herein, "combination" is inclusive of blends, mixtures, alloys, reaction products, and the like. A specific type of copolymer is a polyester carbonate, also known as a polyester-polycarbonate. Such copolymers further contain, in addition to recurring carbonate chain units of the formula (1), units of formula (8):

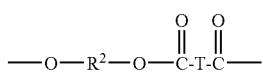

wherein $R^2$ is a divalent group derived from a dihydroxy compound, and may be, for example, a $C_{2-10}$ alkylene group, a $C_{6-20}$ alicyclic group, a $C_{6-20}$ aromatic group or a polyoxyalkylene group in which the alkylene groups contain 2 to about 6 carbon atoms, specifically 2, 3, or 4 carbon atoms; and T is a divalent group derived from a dicarboxylic acid (aliphatic, aromatic, or alkyl aromatic), and may be, for example, a $C_{4-18}$ aliphatic group, a $C_{6-20}$ alkylene group, a $C_{6-20}$ alkylene group, a $C_{6-20}$ alicyclic group, a $C_{6-20}$ alkyl aromatic group, or a $C_{6-20}$ aromatic group.

$R^2$ may be is a $C_{2-30}$ alkylene group having a straight chain, branched chain, or cyclic (including polycyclic) structure. Alternatively, $R^2$ may be derived from an aromatic dihydroxy compound of formula (4) above, or from an aromatic dihydroxy compound of formula (7) above.

Examples of aromatic dicarboxylic acids that may be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is about 91:9 to about 2:98. In another specific embodiment, $R^2$ is a $C_{2-6}$ alkylene group and T is p-phenylene, m-phenylene, naphthalene, a divalent cycloaliphatic group, or a combination thereof. This class of polyester includes the poly(alkylene terephthalates).

The molar ratio of ester units to carbonate units in the copolymers may vary broadly, for example 1:99 to 99:1, specifically 10:90 to 90:10, more specifically 25:75 to 75:25, depending on the desired properties of the final composition.

In an embodiment, the thermoplastic composition comprises a polyester-polycarbonate copolymer, and specifically a polyester-polycarbonate copolymer in which the ester units of formula (8) comprise soft block ester units, also referred to herein as aliphatic dicarboxylic acid ester units. Such a polyester-polycarbonate copolymer comprising soft block ester units is also referred to herein as a poly(aliphatic ester)-polycarbonate. The soft block ester unit can be a $C_{6-20}$ aliphatic dicarboxylic acid ester unit (where $C_{6-20}$ includes the terminal carboxyl groups), and may be straight chain (i.e., unbranched) or branched chain dicarboxylic acids, cycloalkyl or cycloalkylidene-containing dicarboxylic acids units, or combinations of these structural units. In an embodiment, the $C_{6-20}$ aliphatic dicarboxylic acid ester unit includes a straight chain alkylene group comprising methylene ($-CH_2-$) repeating units. In a specific embodiment, a useful soft block ester unit comprises units of formula (8a):

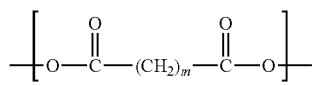
(8a)

where m is 4 to 18. In a specific embodiment of formula (8a), m is 8 to 10. The poly(aliphatic ester)-polycarbonate can include less than or equal to 25 wt % of the soft block unit. In an embodiment, a poly(aliphatic ester)-polycarbonate comprises units of formula (8a) in an amount of 0.5 to 10 wt %, specifically 1 to 9 wt %, and more specifically 3 to 8 wt %, based on the total weight of the poly(aliphatic ester)-polycarbonate.

The poly(aliphatic ester)-polycarbonate is a copolymer of soft block ester units and carbonate units. The poly(aliphatic ester)-polycarbonate is shown in formula (8b):

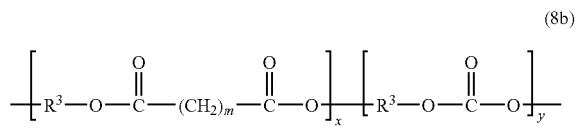
(8b)

where each $R^3$ is independently derived from a dihydroxyaromatic compound of formula (4) or (7), m is 4 to 18, and x and y each represent average weight percentages of the poly(aliphatic ester)-polycarbonate where the average weight percentage ratio x:y is 10:90 to 0.5:99.5, specifically 9:91 to 1:99, and more specifically 8:92 to 3:97, where x+y is 100.

Soft block ester units, as defined herein, can be derived from an alpha, omega $C_{6-20}$ aliphatic dicarboxylic acid or a reactive derivative thereof. In a specific embodiment, the soft block ester units can be derived from an alpha, omega $C_{10-12}$ aliphatic dicarboxylic acid or a reactive derivative thereof. In another specific embodiment, the carboxylate portion of the aliphatic ester unit of formula (8a), in which the terminal carboxylate groups are connected by a chain of repeating methylene ($-CH_2-$) units (where m is as defined for formula (8a)), is derived from the corresponding dicarboxylic acid or reactive derivative thereof, such as the acid halide (specifically, the acid chloride), an ester, or the like. Exemplary alpha, omega dicarboxylic acids (from which the corresponding acid chlorides may be derived) include alpha, omega $C_6$ dicarboxylic acids such as hexanedioic acid (also referred to as adipic acid); alpha, omega $C_{10}$ dicarboxylic acids such as decanedioic acid (also referred to as sebacic acid); and alpha, omega $C_{12}$ dicarboxylic acids such as dodecanedioic acid (sometimes abbreviated as DDDA). It will be appreciated that the aliphatic dicarboxylic acid is not limited to these exemplary carbon chain lengths, and that other chain lengths within the $C_{6-20}$ limitation may be used. A specific embodiment of the poly(aliphatic ester)-polycarbonate having soft block ester units comprising a straight chain methylene group and a bisphenol A polycarbonate group is shown in formula (8c):

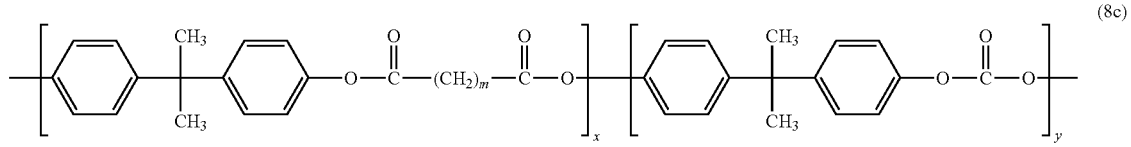
(8c)

where m is 4 to 18 and x and y are as defined for formula (8b). In a specific exemplary embodiment, a useful poly(aliphatic ester)-polycarbonate copolymer comprises sebacic acid ester units and bisphenol A carbonate units (formula (8c), where m is 8, and the average weight ratio of x:y is 6:94).

Desirably, the poly(aliphatic ester)-polycarbonate has a glass transition temperature (Tg) of 110 to 145° C., specifically 115 to 145° C., more specifically 120 to 145°C., more specifically 128 to 139° C., and still more specifically 130 to 139° C.

Polycarbonates, including polyester-polycarbonates, can be manufactured by processes such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a catalyst such as triethylamine or a phase transfer catalyst, under controlled pH conditions, e.g., about 8 to about 10. The most commonly used water immiscible solvents include methylene chloride, 1,2-dichloroethane, chlorobenzene, toluene, and the like.

Carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used. In an exemplary embodiment, an interfacial polymerization reaction to form carbonate linkages uses phosgene as a carbonate precursor, and is referred to as a phosgenation reaction.

Among the phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Useful phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl$^-$, Br$^-$, a $C_{1-8}$ alkoxy group or a $C_{6-18}$ aryloxy group. An effective amount of a phase transfer catalyst may be about 0.1 to about 10 wt % based on the weight of bisphenol in the phosgenation mixture. In another embodiment an effective amount of phase transfer catalyst may be about 0.5 to about 2 wt % based on the weight of bisphenol in the phosgenation mixture.

All types of polycarbonate end groups are contemplated as being useful in the polycarbonate composition, provided that such end groups do not significantly adversely affect desired properties of the compositions.

Branched polycarbonate blocks may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl) phenol), 4-chloroformyl phthalic anhydride, trimesic acid, and benzophenone tetracarboxylic acid. The branching agents may be added at a level of about 0.05 to about 2.0 wt %. Mixtures comprising linear polycarbonates and branched polycarbonates may be used.

A chain stopper (also referred to as a capping agent) may be included during polymerization. The chain stopper limits molecular weight growth rate, and so controls molecular weight in the polycarbonate. Exemplary chain stoppers include certain mono-phenolic compounds, mono-carboxylic acid chlorides, and/or mono-chloroformates. Mono-phenolic chain stoppers are exemplified by monocyclic phenols such as phenol and $C_1$-$C_{22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atom may be specifically mentioned. Certain mono-phenolic UV absorbers may also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Mono-carboxylic acid chlorides may also be used as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to about 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations thereof.

Alternatively, melt processes may be used to make the polycarbonates or polyester-polycarbonates. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a BANBURY® mixer, twin screw extruder, or the like to form a uniform dispersion. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl) carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl)carboxylate, bis(4-acetylphenyl)carboxylate, or a combination comprising at least one of the foregoing. In addition, transesterification catalysts for use may include phase transfer catalysts of formula $(R^3)_4Q^+X$ above, wherein each $R^3$, Q, and X are as defined above. Examples of transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing.

Specifically, polyester-polycarbonates, including the poly(aliphatic ester)-polycarbonates, may be prepared by interfacial polymerization. Rather than utilizing the dicarboxylic acid (such as the alpha, omega $C_{6-20}$ aliphatic dicarboxylic acid) per se, it is possible, and sometimes even preferred, to employ the reactive derivatives of the dicarboxylic acid, such as the corresponding dicarboxylic acid halides, and in particular the acid dichlorides and the acid dibromides. Thus, for example instead of using isophthalic acid, terephthalic acid, or a combination comprising at least one of the foregoing (for poly(arylate ester)-polycarbonates), it is possible to employ isophthaloyl dichloride, terephthaloyl dichloride, and a combination comprising at least one of the foregoing. Similarly, for the poly(aliphatic ester)-polycarbonates, it is possible, and even desirable, to use for example acid chloride derivatives such as a $C_6$ dicarboxylic acid chloride (adipoyl chloride), a $C_{10}$ dicarboxylic acid chloride (sebacoyl chloride), or a $C_{12}$ dicarboxylic acid chloride (dodecanedioyl chloride). The dicarboxylic acid or reactive derivative may be condensed with the dihydroxyaromatic compound in a first condensation, followed by in situ phosgenation to generate the carbonate linkages with the dihydroxyaromatic compound. Alternatively, the dicarboxylic acid or derivative may be condensed with the dihydroxyaromatic compound simultaneously with phosgenation.

In an embodiment, where the melt volume rate of an otherwise compositionally suitable poly(aliphatic ester)-polycarbonate is not suitably high, i.e., where the MVR is less than 13 cc/10 min when measured at 250° C., under a load of 1.2 kg, the poly(aliphatic ester)-polycarbonate may be modified to provide a reaction product with a higher flow (i.e., greater than or equal to 13 cc/10 min when measured at 250° C., under a load of 1.2 kg), by treatment using a redistribution catalyst under conditions of reactive extrusion. During reactive extrusion, the redistribution catalyst is typically included in small amounts of less than or equal to 400 ppm by weight, by injecting a dilute aqueous solution of the redistribution catalyst into the extruder being fed with the poly(aliphatic ester)-polycarbonate.

In an embodiment, the redistribution-catalyst is a tetraalkylphosphonium hydroxide, tetraalkylphosphonium alkoxide, tetraalkylphosphonium aryloxide, a tetraalkylphosphonium carbonate, a tetraalkylammonium hydroxide, a tetraalkylammonium carbonate, a tetraalkylammonium phosphite, a tetraalkylammonium acetate, or a combination comprising at least one of the foregoing catalysts, wherein each alkyl is independently a $C_{1-6}$ alkyl. In a specific embodiment, a useful redistribution catalyst is a tetra $C_{1-6}$ alkylphosphonium hydroxide, $C_{1-6}$ alkyl phosphonium phenoxide, or a combination comprising one or more of the foregoing catalysts. An exemplary redistribution catalyst is tetra-n-butylphosphonium hydroxide.

In an embodiment, the redistribution catalyst is present in an amount of 40 to 120 ppm, specifically 40 to 110 ppm, and more specifically 40 to 100 ppm, by weight based on the weight of the poly(aliphatic ester)-polycarbonate.

Polycarbonates as broadly defined above may further include blends of the above polycarbonates with polyesters. Useful polyesters may include, for example, polyesters having repeating units of formula (8), which include poly(alkylene dicarboxylates), liquid crystalline polyesters, and polyester copolymers. The polyesters described herein are generally completely miscible with the polycarbonates when blended.

Such polyesters generally include aromatic polyesters, poly(alkylene esters) including poly(alkylene arylates), and poly(cycloalkylene diesters). Aromatic polyesters may have a polyester structure according to formula (8), wherein D and T are each aromatic groups as described hereinabove. In an embodiment, useful aromatic polyesters may include, for example, poly(isophthalate-terephthalate-resorcinol)esters, poly(isophthalate-terephthalate-bisphenol A)esters, poly[(isophthalate-terephthalate-resorcinol)ester-co-(isophthalate-terephthalate-bisphenol A)]ester, or a combination comprising at least one of these. Also contemplated are aromatic polyesters with a minor amount, e.g., about 0.5 to about 10 wt %, based on the total weight of the polyester, of units derived from an aliphatic diacid and/or an aliphatic polyol to make copolyesters. Poly(alkylene arylates) may have a polyester structure according to formula (8), wherein T comprises groups derived from aromatic dicarboxylates, cycloaliphatic dicarboxylic acids, or derivatives thereof. Examples of specifically useful T groups include 1,2-, 1,3-, and 1,4-phenylene; 1,4- and 1,5-naphthylenes; cis- or trans-1,4-cyclohexylene; and the like. Specifically, where T is 1,4-phenylene, the poly(alkylene arylate) is a poly(alkylene terephthalate). In addition, for poly(alkylene arylate), specifically useful alkylene groups D include, for example, ethylene, 1,4-butylene, and bis-(alkylene-disubstituted cyclohexane) including cis- and/or trans-1,4-(cyclohexylene) dimethylene. Examples of poly(alkylene terephthalates) include poly(ethylene terephthalate) (PET), poly(1,4-butylene terephthalate) (PBT), and poly(propylene terephthalate) (PPT). Also useful are poly(alkylene naphthoates), such as poly(ethylene naphthanoate) (PEN), and poly(butylene naphthanoate) (PBN). A useful poly(cycloalkylene diester) is poly(cyclohexanedimethylene terephthalate) (PCT). Combinations comprising at least one of the foregoing polyesters may also be used.

Copolymers comprising alkylene terephthalate repeating ester units with other ester groups may also be useful. Useful ester units may include different alkylene terephthalate units, which can be present in the polymer chain as individual units, or as blocks of poly(alkylene terephthalates). Specific examples of such copolymers include poly(cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate).

Poly(cycloalkylene diester)s may also include poly(alkylene cyclohexanedicarboxylate)s. Of these, a specific example is poly(1,4-cyclohexane-dimethanol-1,4-cyclohexanedicarboxylate) (PCCD), having recurring units of formula (9):

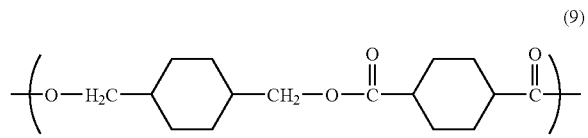

wherein, as described using formula (8), $R^2$ is a 1,4-cyclohexanedimethylene group derived from 1,4-cyclohexanedimethanol, and T is a cyclohexane ring derived from cyclohexanedicarboxylate or a chemical equivalent thereof, and may comprise the cis-isomer, the trans-isomer, or a combination comprising at least one of the foregoing isomers.

The polyesters may be obtained by interfacial polymerization or melt-process condensation as described above, by solution phase condensation, or by transesterification polymerization wherein, for example, a dialkyl ester such as dimethyl terephthalate may be transesterified with ethylene glycol using acid catalysis, to generate poly(ethylene terephthalate). It is possible to use a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end use of the composition.

Polyester-polycarbonate copolymers generally may have a weight average molecular weight (Mw) of 1,500 to 100,000 g/mol, specifically 1,700 to 50,000 g/mol. In an embodiment, poly(aliphatic ester)-polycarbonates have a molecular weight of 15,000 to 45,000 g/mol, specifically 17,000 to 40,000 g/mol, more specifically 20,000 to 30,000 g/mol, and still more specifically 20,000 to 25,000 g/mol. Molecular weight determinations are performed using gel permeation chromatography (GPC), using a crosslinked styrene-divinylbenzene column and calibrated to polycarbonate references. Samples are prepared at a concentration of about 1 mg/ml, and are eluted at a flow rate of about 1.0 ml/min.

A polyester-polycarbonate may in general have an MVR of about 5 to about 150 cc/10 min., specifically about 7 to about 125 cc/10 min, more specifically about 9 to about 110 cc/10 min, and still more specifically about 10 to about 100 cc/10 min., measured at 300° C. and a load of 1.2 kilograms according to ASTM D1238-04 or ISO 1133. Commercial polyester blends with polycarbonate are marketed under the trade name XYLEX®, including for example XYLEX® X7300, and commercial polyester-polycarbonates are marketed under the tradename LEXAN® SLX polymers, including for example LEXAN® SLX-9000, and are available from SABIC Innovative Plastics (formerly GE Plastics).

In an embodiment, poly(aliphatic ester)-polycarbonates have an MVR of about 13 to about 25 cc/10 min, and more specifically about 15 to about 22 cc/10 min, measured at 250° C. and under a load of 1.2 kilograms and a dwell time of 6 minutes, according to ASTM D1238-04. Also in an embodiment, poly(aliphatic ester)-polycarbonates have an MVR of about 13 to about 25 cc/10 min, and more specifically about 15 to about 22 cc/10 min, measured at 250° C. and under a load of 1.2 kilograms and a dwell time of 4 minutes, according to ISO 1133.

In an embodiment, the thermoplastic composition comprises poly(aliphatic ester)-polycarbonate in an amount of 50 to 100 wt %, based on the total weight of poly(aliphatic ester)-polycarbonate and any added polycarbonate. In a specific embodiment, the thermoplastic composition comprises only poly(aliphatic ester)-polycarbonate. In another specific embodiment, the thermoplastic comprises poly(aliphatic ester)-polycarbonate that has been reactively extruded to form a reaction product. In another specific embodiment, the thermoplastic comprises a blend of poly(aliphatic ester)-polycarbonate that has been reactively extruded.

Polycarbonates, as defined above, also include a polysiloxane-polycarbonate copolymer. The polysiloxane (also referred to herein as "polydiorganosiloxane") blocks of the copolymer comprise repeating siloxane units (also referred to herein as "diorganosiloxane units") of formula (10):

wherein each occurrence of R is same or different, and is a $C_{1-13}$ monovalent organic radical. For example, R may independently be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ arylalkyl group, $C_7$-$C_{13}$ arylalkoxy group, $C_7$-$C_{13}$ alkylaryl group, or $C_7$-$C_{13}$ alkylaryloxy group. The foregoing groups may be fully or partially halogenated with fluorine, chlorine, bromine, or iodine, or a combination thereof. Combinations of the foregoing R groups may be used in the same copolymer.

The value of D in formula (10) may vary widely depending on the type and relative amount of each component in the thermoplastic composition, the desired properties of the composition, and like considerations. Generally, D may have an average value of 2 to 1,000, specifically 2 to 500, more specifically 5 to 100. In some applications, D may have an average value of 30 to 60. An exemplary siloxane block may have an average D value of 45.

Where D is of a lower value, e.g., less than 40, it may be desirable to use a relatively larger amount of the polycarbonate-polysiloxane copolymer. Conversely, where D is of a higher value, e.g., greater than 40, it may be necessary to use a relatively lower amount of the polycarbonate-polysiloxane copolymer.

A combination of a first and a second (or more) polysiloxane-polycarbonate copolymer may be used, wherein the average value of D of the first copolymer is less than the average value of D of the second copolymer.

In one embodiment, the polydiorganosiloxane blocks are provided by repeating structural units of formula (11):

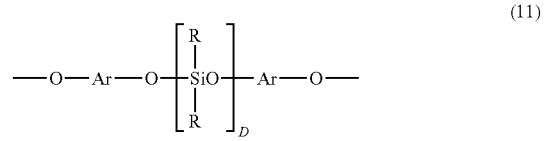

wherein D is as defined above; each R may independently be the same or different, and is as defined above; and each Ar may independently be the same or different, and is a substituted or unsubstituted $C_6$-$C_{30}$ arylene radical, wherein the bonds are directly connected to an aromatic moiety. Useful Ar groups in formula (11) may be derived from a $C_6$-$C_{30}$ dihydroxyarylene compound, for example a dihydroxyarylene compound of formula (3), (4), or (7) above. Combinations comprising at least one of the foregoing dihydroxyarylene compounds may also be used. Specific examples of dihydroxyarylene compounds are 1,1-bis(4-hydroxyphenyl) methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl) propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulphide), and 1,1-bis(4-hydroxy-t-butylphenyl)propane. Combinations comprising at least one of the foregoing dihydroxy compounds may also be used.

Units of formula (11) may be derived from the corresponding dihydroxy compound of formula (12):

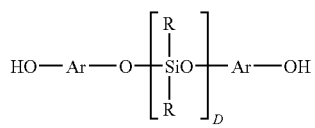

(12)

wherein R, Ar, and D are as described above. Compounds of formula (12) may be obtained by the reaction of a dihydroxyarylene compound with, for example, an alpha, omega-bisacetoxypolydiorangonosiloxane under phase transfer conditions.

In another embodiment, polydiorganosiloxane blocks comprise units of formula (13):

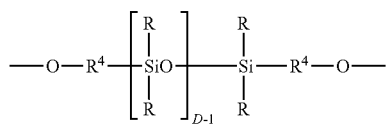

(13)

wherein R and D are as described above, and each occurrence of $R^4$ is independently a divalent $C_1$-$C_{30}$ alkylene, and wherein the polymerized polysiloxane unit is the reaction residue of its corresponding dihydroxy compound. In a specific embodiment, the polydiorganosiloxane blocks are provided by repeating structural units of formula (14):

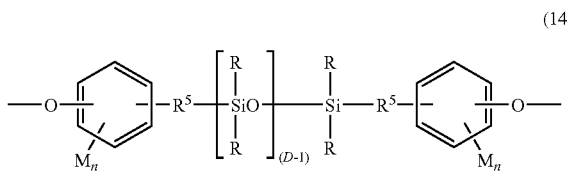

(14)

wherein R and D are as defined above. Each $R^5$ in formula (14) is independently a divalent $C_2$-$C_8$ aliphatic group. Each M in formula (14) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ arylalkyl, $C_7$-$C_{12}$ arylalkoxy, $C_7$-$C_{12}$ alkylaryl, or $C_7$-$C_{12}$ alkylaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^5$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, R is methoxy, M is one, $R^5$ is a divalent $C_1$-$C_3$ aliphatic group, and R is methyl.

Units of formula (14) may be derived from the corresponding dihydroxy polydiorganosiloxane (15):

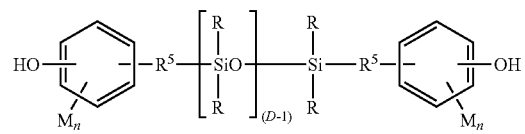

(15)

wherein R, D, M, $R^5$, and n are as described above. Such dihydroxy polysiloxanes can be made by effecting a platinum catalyzed addition between a siloxane hydride of formula (16):

(16)

wherein R and D are as previously defined, and an aliphatically unsaturated monohydric phenol. Useful aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures comprising at least one of the foregoing may also be used.

Polysiloxane-polycarbonates comprise 50 to 99.9 wt % of carbonate units and 0.1 to 50 wt % siloxane units, based on the total weight of the polysiloxane-polycarbonate. Specific polysiloxane-polycarbonate copolymers comprise 90 to 99 wt %, specifically 75 to 99 wt %, of carbonate units and 1 to 25 wt %, specifically 1 to 10 wt %, siloxane units. An exemplary polysiloxane-polycarbonate copolymer may comprise about 6 wt % siloxane units. Another exemplary polysiloxane-polycarbonate comprises about 20 wt % siloxane units. All references to weight percent compositions in the polysiloxane-polycarbonate are based on the total weight of the polysiloxane-polycarbonate.

Exemplary polysiloxane-polycarbonates comprise polysiloxane units derived from dimethylsiloxane units (e.g., formula (11) where R is methyl), and carbonate units derived from bisphenol A, e.g., the dihydroxy compound of formula (3) in which each of $A^1$ and $A^2$ is p-phenylene and $Y^1$ is isopropylidene. Polysiloxane-polycarbonates may have a weight average molecular weight of 2,000 to 100,000 g/mol, specifically 5,000 to 50,000 g/mol. Some specific polysiloxane-polycarbonates have, for example, a weigh average molecular weight of 15,000 to 45,000 g/mol. Molecular weights referred to herein are as measured by gel permeation chromatography using a crosslinked styrene-divinyl benzene column, at a sample concentration of about 1 milligram per milliliter, and as calibrated with polycarbonate standards.

The polysiloxane-polycarbonate can have a melt volume flow rate, measured at 300° C. under a load of 1.2 kg, of 1 to 50 cc/10 min, specifically 2 to 30 cc/10 min. Specific polysiloxane-polycarbonates can have a melt volume rate measured at 300° C. under a load of 1.2 kg, of 5 to 15 cc/10 min. Mixtures of polysiloxane-polycarbonates of different flow properties may be used to achieve the overall desired flow property. Commercial polysiloxane-polycarbonates are marketed under the trade name LEXAN® EXL polycarbonates, available from SABIC Innovative Plastics (formerly GE Plastics).

Where included, the thermoplastic composition may comprise polycarbonate, including blends of polycarbonate homo and/or copolymers, polyesters, polyester-polycarbonates other than the poly(aliphatic ester)-polycarbonates disclosed above, or polysiloxane-polycarbonate in an amount of less than or equal to 50 wt %, specifically 1 to 50 wt %, and more specifically 10 to 50 wt %, based on the total weight of poly(aliphatic ester)-polycarbonate and any added polycarbonate, provided the addition of the polycarbonate does not significantly adversely affect the desired properties of the thermoplastic composition.

In an embodiment, the thermoplastic composition has a soft block content (i.e., an alpha, omega $C_{6-20}$ dicarboxylic acid ester unit content) of 0.5 to 10 wt %, specifically 1 to 9 wt %, and more specifically 3 to 8 wt %, based on the total weight of the poly(aliphatic ester)-polycarbonate copolymer and any added polycarbonate.

The thermoplastic composition disclosed herein comprises a poly(aliphatic ester)-polycarbonate. The thermoplastic composition may further include a polycarbonate different from the poly(aliphatic ester)-polycarbonate.

Surprisingly, a high flow, ductile, transparent thermoplastic composition comprising a poly(aliphatic ester)-polycarbonate copolymer, as described above, meets or exceeds the desired performance requirements (i.e., transparency, and an MVR of up to 25 cc/10 min at 300° C. under a load of 1.2 Kg). The poly(aliphatic ester)-polycarbonate copolymer, i.e., a polycarbonate having aliphatic dicarboxylic acid ester soft block units randomly incorporated along the copolymer chain, has soft block segment (e.g., a flexible chain of repeating —$CH_2$— units) in the polymer chain, where inclusion of these soft block segments in a polycarbonate reduces the glass-transition temperatures (Tg) of the resulting soft block-containing polycarbonate copolymer. These thermoplastic compositions, comprising soft block in amounts of 0.5 to 10 wt % of the weight of the poly(aliphatic ester)-polycarbonate, are transparent and have higher MVR than polycarbonate homopolymers or copolymers without the soft block.

While the soft block units of the poly(aliphatic ester)-polycarbonate copolymers may not be specifically limited to the alpha, omega $C_{6-20}$ dicarboxylic acids disclosed herein, it is believed that shorter soft block chain lengths (less than $C_6$, including the carboxylic acid groups) may not provide sufficient chain flexibility in the poly(aliphatic ester)-polycarbonate to increase the MVR to the desired levels (i.e., greater than or equal to about 13 cc/10 min at 250° C. and 1.2 Kg load); likewise, increasing the soft block chain lengths (greater than $C_{20}$, including the carboxylic acid groups) may result in creation of crystalline domains within the poly(aliphatic ester)-polycarbonate composition, which in turn can lead to phase separation of the domains that can manifest as reduced transparency and increased haze, and may affect the thermal properties such as Tg (where multiple Tg values may result for different phase separated domains) and MVR (decreasing MVR to values of less than about 13 cc/10 min at 250° C. and 1.2 Kg load).

In some embodiments of the thermoplastic composition, the poly(aliphatic ester)-polycarbonate is used directly as prepared by interfacial or melt-processing methods. However, in some alternate embodiments, where the poly(aliphatic ester)-polycarbonate may have inadequately low melt flow (i.e., less than about 13 cc/10 min at 250° C. and 1.2 Kg load) and therefore may not fully fill the mold, the poly (aliphatic ester)-polycarbonate may further be processed by reactive extrusion with a redistribution catalyst, such as for example, a tetra-n-butyl phosphonium hydroxide solution in water (up to 40% by weight). Surprisingly, poly(aliphatic ester)-polycarbonates which otherwise have desirable impact strength and transparency but with insufficiently high melt flow may, by the action of the redistribution catalyst, form a reaction product with higher melt flow (i.e., greater than 13 cc/10 min at 250° C. and 1.2 Kg), without significant loss of other desired features of the thermoplastic and the lens articles prepared therefrom such as impact strength, low birefringence, mold-filling and mold-release capability, high visible light transparency (percent transmittance) of greater than 85%, and less than 1% haze, measured at 3.2 mm thickness.

Exemplary thermoplastic compositions include poly(sebacic acid ester)-co-(bisphenol A carbonate). It will be understood that a wide variety of thermoplastic compositions and articles derived from them can be obtained by not only changing the thermoplastic compositions (e.g., by replacing sebacic acid with adipic acid in the poly(sebacic acid ester)-co-(bisphenol A carbonate) but by changing the amounts of sebacic acid content in the blends while maintaining a constant molecular weight. Similarly, new thermoplastic compositions may be identified by changing the molecular weights of the components in the exemplary copolymer blends while keeping, for example, sebacic acid content constant.

In particular, the ductility, transparency and melt flow of the thermoplastic compositions may be varied by the composition of the poly(aliphatic ester)-polycarbonate. For example, wt % of aliphatic dicarboxylic acid ester units (e.g., sebacic acid) may be varied from 1 to 10 wt % of the total weight of the thermoplastic composition of the total weight of the thermoplastic composition. The distribution (in the polymer chain) of the sebacic acid (or other dicarboxylic acid ester) in the copolymers may also be varied by choice of synthetic method of the poly(aliphatic ester)-polycarbonate copolymers (e.g., interfacial, melt processed, or further reactive extrusion of a low MVR poly(aliphatic ester)-polycarbonate with a redistribution catalyst) to obtain the desired properties. In this way, thermoplastic compositions having high flow (e.g. MVR of up to 25 cc/10 min. at 1.2 Kg and 250° C.) may further be achieved where the poly(aliphatic ester)-polycarbonate is too low in MVR, or is opaque (where the soft blocks are too great in length, the concentration of the soft block in the copolymer is too high, or where the overall molecular weight of the copolymer is too high, or where the copolymer has a block architecture in which the soft block units in the copolymer aggregate to form larger blocks), while transparent products with greater than or equal to 85% transmission, haze of less than 1% (measured on a 3.2 mm thick molded plaque), and high flow (e.g., up to an MVR of 25 cc/10 min. at 1.2 Kg and 250° C.), and ductility may be obtained. Thermoplastic compositions having this combination of properties is not obtainable from polycarbonate compositions of, for example, bisphenol A polycarbonate homopolymer absent a poly(aliphatic ester)-polycarbonate copolymer.

The thermoplastic composition thus comprises poly(aliphatic ester)-polycarbonate copolymer, and optionally a polycarbonate polymer not identical to the poly(aliphatic ester)-polycarbonate. Such added polycarbonate polymer may be included but is not essential to the thermoplastic composition. In an embodiment, where desired, the thermoplastic composition may include the polycarbonate in amounts of less than or equal to 50 wt %, based on the total weight of poly(aliphatic ester)-polycarbonate and any added polycarbonate. Specifically useful in the thermoplastic polymer include homopolycarbonates, copolycarbonates, polyester-polycarbonates, polysiloxane-polycarbonates, blends thereof with polyesters, and combinations comprising at least one of the foregoing polycarbonate-type resins or blends. It should further be noted that the inclusion of other polymers such as polycarbonate is permitted provided the desired properties of the thermoplastic composition are not significantly adversely affected. In a specific embodiment, a thermoplastic composition consists essentially of a poly(aliphatic ester)-polycarbonate copolymer. In another specific embodiment, the thermoplastic composition consists of poly(aliphatic ester)-polycarbonate copolymer.

In addition to the poly(aliphatic ester)-polycarbonate copolymer and any added polycarbonate polymer as described hereinabove, the thermoplastic composition can further include various other non-essential additives ordinarily incorporated with thermoplastic compositions of this type, where the additives are selected so as not to significantly adversely affect the desired properties of the thermoplastic composition. Mixtures of additives may be used. Such additives may be mixed at a suitable time during the mixing of the components for forming the thermoplastic composition.

Useful additives contemplated herein include, but are not limited to, colorants including dyes and pigments, antioxidants, heat stabilizers, light and/or UV light stabilizers, plasticizers, lubricants, mold release agents, flame retardants, antistatic agents, anti-drip agents, radiation (gamma) stabilizers, and the like, or a combination comprising at least one of the foregoing additives. While it is contemplated that other resins and or additives may be used in the thermoplastic compositions described herein, such additives while desirable in some exemplary embodiments are not essential.

In an embodiment, the thermoplastic composition has an MVR of about 13 to about 25 cc/10 min, and more specifically about 15 to about 22 cc/10 min, measured at 250° C. and under a load of 1.2 kilograms at a dwell time of 6 minutes according to ASTM D1238-04. Also in an embodiment, the thermoplastic composition has an MVR of about 13 to about 25 cc/10 min, and more specifically about 15 to about 22 cc/10 min, measured at 250° C. and under a load of 1.2 kilograms at a dwell time of 4 minutes according to ISO 1133.

In an embodiment, the thermoplastic composition, when molded into an article having a thickness of 3.2 mm, has a percent transmittance of greater than 85%, specifically greater than or equal to 87%, more specifically greater than or equal to 89%, and still more specifically greater than or equal to 90%, according to ASTM D1003-00.

In an embodiment, the thermoplastic composition, when molded into an article having a thickness of 3.2 mm, has a haze of less than or equal to 1%, specifically less than or equal to 0.95%, and more specifically less than or equal to 0.9% according to ASTM D1003-00.

In an embodiment, the thermoplastic composition, when molded into an article having a thickness of 3.2 mm, has a yellowness index (YI) of less than 4, specifically less than 3, and more specifically less than 2.5, when measured according to ASTM D1925-70.

The thermoplastic composition may be manufactured by methods generally available in the art, for example, in one embodiment, in one manner of proceeding, powdered poly (aliphatic ester)-polycarbonate copolymer, any added polycarbonate, and other additives as desired are first mixed in a HENSCHEL MIXER® high speed mixer. Other low shear processes including but not limited to hand mixing may also accomplish this blending. The blend is then fed into the throat of an extruder via a hopper. Alternatively, one or more of the components may be incorporated into the composition by feeding directly into the extruder at the throat and/or downstream through a sidestuffer. Additives may also be compounded into a masterbatch with a desired polymeric resin and fed into the extruder. The extruder is generally operated at a temperature higher than that necessary to cause the composition to flow, but at which temperature components of the thermoplastic composition do not decompose so as to significantly adversely affect the composition. The extrudate is immediately quenched in a water bath and pelletized. The pellets, so prepared when cutting the extrudate, may be one-fourth inch long or less as desired. Such pellets may be used for subsequent molding, shaping, or forming.

In a specific embodiment, a method of preparing a thermoplastic composition comprises melt combining a poly(aliphatic ester)-polycarbonate copolymer, polysiloxane-polycarbonate copolymer, and any added polycarbonate. The melt combining can be done by extrusion. In an embodiment, the proportions of poly(aliphatic ester)-polycarbonate copolymer, polysiloxane-polycarbonate copolymer, and any added polycarbonate are selected such that the resultant composition maximizes the melt volume rate (MVR) while not significantly adversely affecting low temperature NII and ductility. In a further specific embodiment, the thermoplastic polymer comprises a polycarbonate-type polymer (in addition to and not identical to the poly(aliphatic ester)-polycarbonate) as defined hereinabove.

In a specific embodiment, the compounding extruder is a twin-screw extruder. The extruder is typically operated at a temperature of 180 to 385° C., specifically 200 to 330° C., more specifically 220 to 300° C., wherein the die temperature may be different. The extruded thermoplastic composition is quenched in water and pelletized.

The thermoplastic composition can be provided as pellets, and is useful to form articles for use in devices such as lenses for use in portable electronics applications including cell phones, cameras, personal digital assistants, DVD players and recording devices, and the like. In an embodiment, the thermoplastic compositions may be molded into useful shaped articles by injection molding. Desirably, the thermoplastic composition has excellent mold filling capability due to its high flow properties.

Products (e.g., articles) made from the thermoplastic composition(s) can specifically be used in a variety of applications including thin-wall articles, where transparency, precision as defined by a high degree of reproducibility, retention of mechanical properties including impact strength, and precise optical properties are required. Such a thermoplastic composition would reduce the residual stress in the molded article due to the improved flow.

In an embodiment, the thermoplastic composition is used in the manufacture of optical lenses including camera lenses, e.g., for mobile telephone cameras, and for digital still photography cameras; and automotive camera lenses. For applications in which a lens set is required, such as for camera lenses, one or more of these optical lenses may be manufactured using the thermoplastic composition. It has surprisingly been found that use of the thermoplastic composition, which has improved flow (MVR) for excellent mold filling properties but which maintains desirable mechanical properties can, in the manufacture of such lenses, provide a high degree of reproducibility for successive lenses molded from the thermoplastic composition.

A method of manufacturing the lenses is also disclosed. During the molding process the replication of the molded lens needs to be very accurate to the specifications for the lens, and consistently reproducible lens-to-lens; otherwise, lenses which do not meet the reproducibility standards will give blurred images. In an embodiment, a method of manufacturing an optical lens (such as a camera lens) as prepared from the thermoplastic composition provides lenses having precision dimensions that deviate by less than 400 nm from a reference standard when measured by three dimensional contact profilometry. In a further embodiment, successive optical lenses prepared from the thermoplastic each have precision dimensions that deviate by less than 400 nm from a reference standard when measured by three-dimensional contact measurement.

The optical lenses disclosed herein are defined by several dimensional features. In an embodiment, the size of the lens is characterized by the term "Effective Lens Area", which is defined as the area of the lens where the curvature is positive, and hence light which is refracted through this area is usable in actual imaging. "Curvature" as defined herein, is the reciprocal of the optical radius of the lens (as defined by the light path). For example a flat surface has infinite radius and therefore zero curvature. Lenses such as those described herein include a flat portion around the periphery of the lens, which is used for mounting the lens into the optical assembly. This flat portion is not considered part of the effective lens area. A typical lens has at least two surfaces, a first and a second surface. On the first (incident) surface, light enters the lens and exits through the second (refractive) surface. One or both of theses surfaces may have a curvature. The effective lens area as defined above may be the same for the first and second surfaces, or may be different for the first and second surfaces. Where different, the larger value of the effective surface area for the first and second surfaces is considered to be the effective lens area for the overall lens.

In an embodiment, an optical lens has an Effective Lens Area (ELA) of 0.5 mm$^2$ to 100 mm$^2$. In a specific embodiment, an optical lens has an ELA of 0.5 mm$^2$ to 10 mm$^2$, where in a more specific embodiment, the optical lenses may be used for camera lenses and automotive lenses. In another specific embodiment, an optical lens has an ELA of 5 mm$^2$ to 100 mm$^2$, where in another more specific embodiment, the optical lenses may be used for digital still camera lenses.

ELA diameter as defined herein describes the diameter measured at the outermost periphery of the effective (optically useable) area of the lens; whereas overall diameter of the lens is the diameter which includes the non-optically relevant flat portion. For example, a mobile phone camera lens typically has a 2.3 mm diameter for effective area. To further illustrate the relationship between lens diameter and Effective Lens Area (ELA), for a lens of 2 mm in diameter, the ELA would be 3.1 mm$^2$; for a lens of 8 mm in diameter, the ELA would be 50.3 mm$^2$; for a lens of 10 mm in diameter, the ELA would be 78.5 mm$^2$; and for a lens of 12 mm in diameter, the ELA would be 113.1 mm$^2$.

The optical lenses may also be characterized by their thicknesses. Lens thickness, as defined herein, is measured at the center of the lens (i.e., along the z axis, orthogonal to the diameter of the lens which is measured in the x-y plane of the lens). Since lenses have curvature, the thickness of the lens may vary along the contour of the surface. Also, depending upon the type of the lens (convex, concave, etc.) the variation of the thickness can differ widely. In an embodiment, the optical lens has a thickness of 0.25 to 2.5 mm, specifically 0.5 to 2.4 mm, and more specifically 0.8 to 2.3 mm, measured at the center of the lens.

Exemplary lens types (by application), and the interrelationship of different dimensions of the Effective Lens Area (ELA), the diameter of the ELA (i.e., the measured diameter of the optically useful portion of the lens defined by the ELA), overall diameter (i.e., the overall diameter of the peripheral flat portion and the diameter of the Effective Lens Area) and the thickness of the lens, are illustrated in the Table 1, below.

TABLE 1

| Lens type | Effective Lens Area (ELA; mm$^2$) | Diameter of ELA (mm) | Overall Diameter of molded lens (mm) | Lens Thickness (center, in mm) |
|---|---|---|---|---|
| Mobile phone camera lens | 4.2 | 2.3 | 6.4 | 0.66 |
| Mobile phone camera lens | 3.5 | 2.1 | 4.8 | 1.05 |
| Mobile phone camera lens | 0.8 | 1 | 3.5 | 0.48 |
| Automotive Camera lens | 22.1 | 5.3 | 7.7 | 1.57 |
| Automotive Camera lens | 16.6 | 4.6 | 7 | 2.38 |

The lenses described hereinabove may have any useful shape within the constraints of the effective areas and thicknesses defined hereinabove. For example, the camera lens may be a spherical or aspherical lens having a focal point. A spherical lens may be, for example, a double-convex lens, double-concave lens, piano-convex lens, piano-concave lens, meniscus convex lens or meniscus concave lens. Alternatively, an aspherical lens has an ellipsoidal, hyperbolic, or parabolic face.

Also surprisingly, the birefringence of the optical lenses is significantly lower than that of comparable lenses prepared using polycarbonate without the soft block. Without wishing to be bound by theory, it is believed that the additional flexibility in the polymer chain of the poly(aliphatic ester)-polycarbonate provides for more randomized orientation during flow into the mold of the molding machine, where the chains of less flexible polymers (such as, for example, bisphenol A homopolymer) may orient to the direction of extrusion (flow). Such randomization of orientation may therefore minimize intra- and interchain ordering, which in turn decreases the polarizing effect and hence, reduces birefringence in the resulting optical lens. To obtain acceptable replication and birefringence of a molded lens, the mold temperature is desirably from 115 to 135° C., the cylinder temperature is 300 to 340° C., and the cooling time is between 45 and 75 seconds.

Thus, in an embodiment, an optical lens molded at a mold temperature of 120° C., a cylinder temperature of 310° C., and a holding pressure of 80 MPa for 0.8 seconds, has an averaged retardation of less than 81 nm, specifically less than 76 nm, and more specifically less than 73 nm measured at a wavelength of 590 nm according to the Parallel Nicols method. In a specific embodiment, an optical lens molded from the thermoplastic composition has surface variation that is within a 400 nm (0.4 micrometer) overall tolerance measured by three dimensional contact profilometry, and also has an average retardation of less than 76 nm, specifically less than 73 nm, measured at a wavelength of 590 nm according to the Parallel Nicols method. In another embodiment, an optical lens molded from the thermoplastic composition has a birefringence that is lower than the birefringence of an optical lens molded from an optical quality bisphenol A polycarbonate having a melt volume rate of about 11 cc/10 min at 250° C. and under a load of 1.2 Kg and a dwell time of 6 minutes, according to ASTM D1238-04.

While specific applications and articles are disclosed herein, one skilled in the art will appreciate that the applications of the thermoplastic compositions herein should not be considered as limited to these applications.

The thermoplastic composition is further illustrated by the following non-limiting examples.

All thermoplastic compositions for the examples (abbreviated Ex. in the following Table 3) and comparative examples (abbreviated CEx. in the following Table 3) were prepared using one or more of the following components listed in Table 2.

TABLE 2

| Component | Description | Source |
|---|---|---|
| PAE-PC-1 | 6 wt % Sebacic acid-co-Bisphenol A polycarbonate (polyester-polycarbonate copolymer with p-cumylphenol (PCP) endcap), MVR = 19 cc/10 min at 250° C. under 1.2 kg load and 6 minute dwell time, Mw = 18,300 g/mol | SABIC Innovative Plastics |
| PAE-PC-2 | 6 wt % Sebacic acid-co-Bisphenol A polycarbonate (polyester-polycarbonate copolymer with p-cumylphenol (PCP) endcap), MVR = 13.8 cc/10 min at 250° C. under 1.2 kg load and 6 minute dwell time, Mw = 19,500 g/mol | SABIC Innovative Plastics |
| OQ-PC | Optical Quality (OQ) Bisphenol A Polycarbonate (with phenol endcap), MVR = 11 cc/10 min at 250° C. under 1.2 kg load and 6 minute dwell time, Mw = 18,100 g/mol | SABIC Innovative Plastics |
| GMS | Glycerol Monostearate, available as PATIONIC ® 901 and as Rikenmal S-100A | Caravan Ingredients or Riken Vitamin Co. Ltd. |
| Stabilizer | DOVERPHOS ® S-9228 | Dover Chemical |
| TBPH | Tetra-n-butyl phosphonium hydroxide, 40 wt % aqueous solution | Sachem Chemical Co. |

Compounded thermoplastic compositions were compounded on a Werner and Pfleiderer ZSK 25-mm twin-screw extruder operating at a barrel temperature of from 40-200-225-250-260-260-260-260° C. at a feed rate of 20 Kg/h and a screw speed of 350 rpm. The twin-screw extruder had enough distributive and dispersive mixing elements to produce good mixing of the thermoplastic compositions. The compositions were subsequently dried at about 120° C. for 4 hours and then molded on a Husky or BOY injection-molding machine using barrel temperature of 255-260-250-240° C. and mold temperatures of 70 or 90° C., and cooled for 30 seconds.

Thermoplastic compositions were molded into 14 mm outside diameter (OD) lenses as follows. The thermoplastic compositions were loaded into a Nihon Yuki HF1 Hungry-Feeder single-screw extruder operating at a cylinder temperature of 300 to 340° C., and were fed to a FANUC ROBOSHOT S-2000i 50B, 500 kilo-Newton (50 ton-force) injection-molding machine with a maximum injection speed of 330 mm/sec for optical applications, operating at a mold temperature of 115 to 135° C. Drying was accomplished using a 44-liter Matsui MCAX-140-J medium temperature controller operating at 60 to 200° C. with a 10 micrometer filter, and a nitrogen purge using a Taiyo Nissan M-10 nitrogen generator providing a nitrogen purity of 99.99%, and were cooled for 60 seconds. The molded lenses were removed by a Yushin HopFive 450 Runner Take-out Robot with a 450 mm stroke and 60°-90° swing angle. All lenses were molded in a Class 10,000 clean room environment. It will be recognized by one skilled in the art that the extrusion and molding methods are not limited to these temperatures.

Properties of the thermoplastic compositions were determined herein as follows. Melt Volume Rate (MVR) was determined at 250° C. under a load of 1.2 kg, and at a dwell time of 4 minutes or 12 minutes according to ISO 1133, or 6 minutes according to ASTM D1238-04, and is reported in units of cc/10 min. Molecular weight of polymers (Mw) was determined using gel permeation chromatography using a crosslinked styrene-divinylbenzene column, a sample concentration of about 1 mg/ml, and an elution rate of toluene or chloroform eluent of 0.5 to 1.5 ml/min, and calibrated to polycarbonate standards.

Glass transition temperature (Tg, at half heat capacity, in ° C.) was determined from the second heat using a differential scanning calorimeter (DSC) operating at a temperature ramp rate of 10° C./min. Heat distortion/deflection temperature (HDT) (° C.) was determined edgewise at 1.8 MPa according to ASTM D648-06.

Notched Izod impact (NII) and unnotched Izod impact (UNI) testing was determined on 80 mm×10 mm×3 mm molded samples (bars) according to ASTM D256-04 or ISO 180, at temperature of 23° C., where the NII and UNI impact strengths are each reported in units of kilojoules per square meter (kJ/m$^2$).

Multi Axial Impact (MAI) reported in Newtons (N), energy at maximum deflection and at break both reported in Joules (J), deflection at break (mm), and failure mode were determined using 3.2 mm disks according to ISO 6602 or ASTM D3763. Tensile modulus (MPa), tensile stress at break (MPa) and tensile strain (%) were each determined for molded articles according to ISO 527 at a temperature of 23° C. Vicat softening temperature is reported in degrees Centigrade (° C.), according to ASTM D1525.

Color capability was performed using a ColorEye™ 7000A spectrophotometer manufactured by Gretagmacbeth. The CIE (L*, a*, b*) value was determined on 3.2 mm color chips under reflectance mode according to ASTM 6290, and calibrated using a high gloss polycarbonate standard at a white pigment (TiO$_2$) loading of 5 wt %. The color capability was determined from the absorbance spectral data according to the CIELAB color measurement method detailed by CIE (Commission Internationale de l'Eclairage). The values of E*, L*, a* and b* are reported for the Examples tested.

Haze (%) and light transmission (%) were each determined using 3.2 mm molded plaques according to ASTM D1003-00. Yellowness index (YI) was determined according to ASTM D1925-70.

Relationship of Poly(aliphatic ester)-polycarbonate composition to Glass Transition Temperature. For soft-block copolymer materials, the glass transition temperature depends on the percent soft-block monomer as well as the molecular weight. FIG. 1 is a plot of glass transition temperature versus percent soft block (sebacic acid) for poly(aliphatic ester)-polycarbonates. The plot illustrates the variation in glass transition temperature for different poly(aliphatic ester)-polycarbonates (0.5, 2, 4, 6, 8, 10, and 12 wt % sebacic acid content), where Tg exhibits a linear decrease as a function of increasing soft block content for the copolymer. The weight average molecular weight was maintained at about 18,000 g/mol for each of these samples. Further experimentation was carried out for the Example below on a material comprising 6 wt % sebacic acid.

Table 3 shows compositional information and properties tested according to the above methods for Comparative Examples 1-7 and Examples 1 and 2, as described below.

TABLE 3

| Component | CEx. 1 | Ex. 1 |
|---|---|---|
| PAE-PC-1 (wt %) | — | 100 |
| OQ-PC (wt %) | 100 | — |
| MVR 250° C., 1.2 kg load, 6 min. dwell (cc/10 min) | 11 | 19 |
| Tg (° C.) | 143 | 130 |
| HDT (1.8 MPa. edgewise) (° C.) | 124 | 110 |
| NII (23° C.) (kJ/m$^2$) | 44 | 56 |
| UNI (23° C.) (kJ/m$^2$) | NB | NB |
| MAI (23° C.) (N) | 7,960 | 8,350 |
| Energy@max (J) | 82 | 94 |
| Energy@break (J) | 87 | 102 |
| Deflection@ break (mm) | 17 | 20 |
| Failure Mode | 2D | 4D |
| Tensile Modulus (MPa) | 2,350 | 2,300 |
| Tensile Stress@break - avg. (MPa) | 50 | 50 |
| Tensile Strain@break - avg. (%) | >60 | >60 |
| Transmittance (%) | 91.6 | 90.7 |
| Haze (%) | 0.4 | 0.8 |
| Yellowness Index | 1.2 | 3.6 |

Table 3 shows compositional information and properties tested according to the above methods for the thermoplastic compositions of Example 1 (Ex. 1) and Comparative Example 1 (CEx. 1), prepared from PAE-PC-1 and BPA-PC found in Table 1.

In the properties of the thermoplastic compositions shown in Table 3, it can be seen that the viscosity of the thermoplastic compositions of Example 1 and Comparative Example 1, is significantly lower (i.e., a higher MVR value, measured at 250° C., 1.2 kg load, and 6 min. dwell time, of 19 cc/10 min) for the PAE-PC-1 relative to the OQ-PC material (MVR of 11 cc/10 min, identical measurement conditions). For BPA-polycarbonate resins such as OQ-PC, it is known that an increase in MVR is also accompanied by a reduction in impact performance.

While the thermal performance (Tg) shows a modest decrease for the PAE-PC-1 of Example 1, which is not unexpected in view of the increase in MVR for this composition, the mechanical properties of the PAE-PC-1 of Example 1 can be seen to be comparable with those of the OQ-PC of Comparative Example 1.

The birefringence measurements of the lenses exhibiting the best replication are as described below for FIG. 4.

Figure 2A:
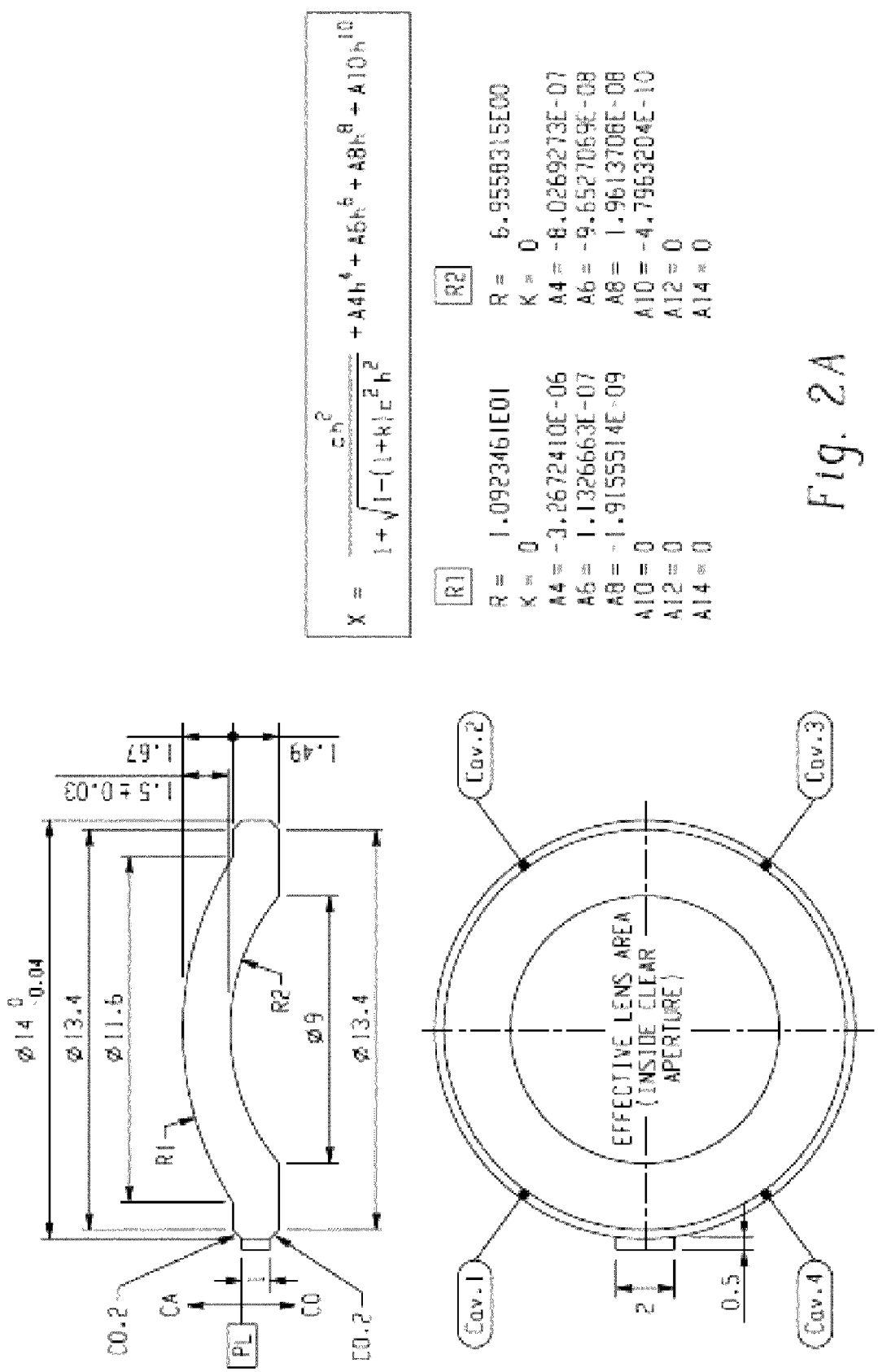
FIG. 2A is a schematic diagram of an exemplary lens molded from the thermoplastic compositions.
Figure 2B:
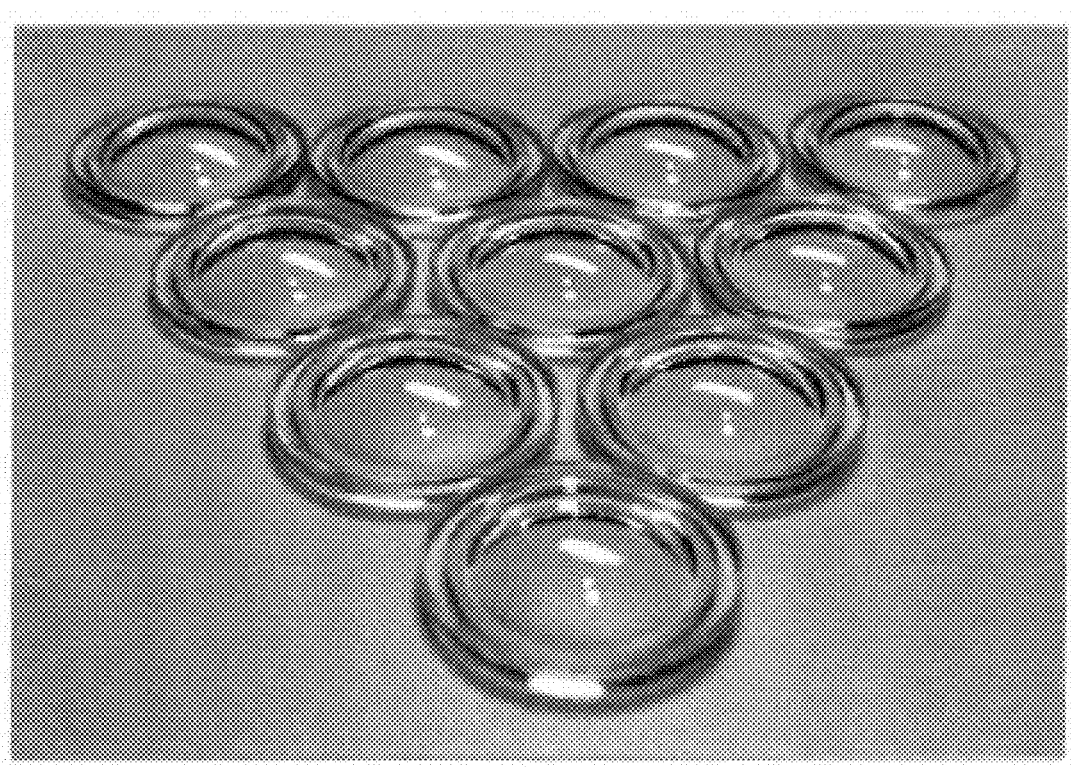
FIG. 2B is a photograph of molded lenses.

The molding replication performance of a commercially available, high flow, optical grade material (OQ-PC) was compared with that of a poly(aliphatic ester)-polycarbonate (PAE-PC-1). Aspherical lenses (meniscus lenses) as test articles, having an effective aperture diameter (Φ) of 14 mm and a thickness of 1.5 mm, were molded from each of these materials using an aspherical lens molding tool capable of producing bi-concave or meniscus lenses. A schematic diagram of the sample lens molded using this tool is shown in FIG. 2A, and a photograph showing 10 exemplary lenses molded using this tool is seen in FIG. 2B.

Figure 3A:
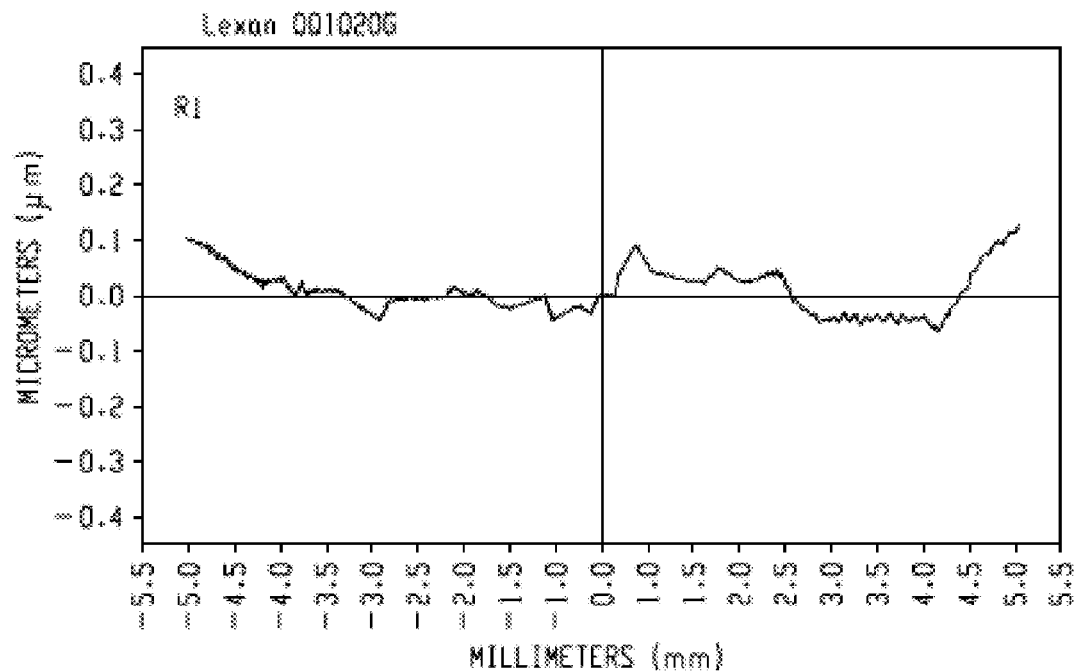
FIG. 3 shows (A) a surface profile of a lens prepared using a polycarbonate, and (B) for a lens prepared using a poly (aliphatic ester)-polycarbonate.
Figure 3B:
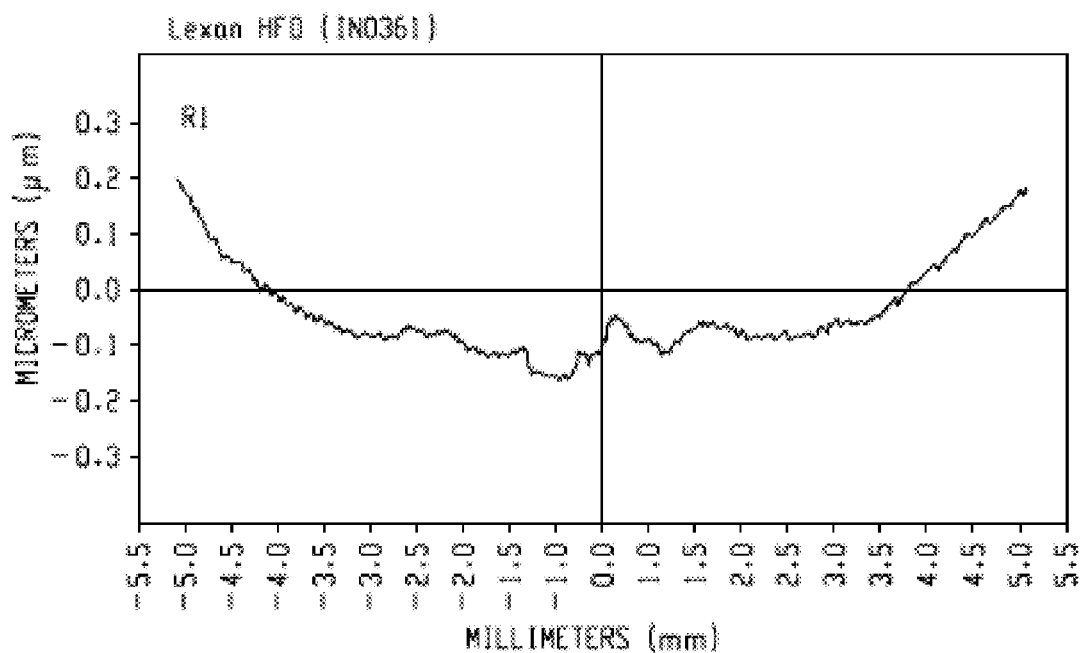

Replication of lenses during molding. Replication (i.e., lens-to-lens reproducibility in conformity with a set of measurement standards) was determined using a Taylor-Hobson Form TALYSURF® PGI profilometer, with a 120 or 200 mm traverse unit, gauge range from 12.5 mm, a 0.8 nm to 12.8 nm gauge resolution and 1/10λ from measurement performance for optics. The degree of high precision in the molded lenses is measured by three-dimensional (3D) contact measurements. Data obtained from the profilometer measurement showed that replication under the optimal molding conditions for each composition (as determined by designed experiment, where the lens molded from the material of CEx. 1 was molded at a mold temperature of 135° C., a cylinder temperature of 330° C., and a holding pressure and time sequence of 80 MPa/0.8 sec, 50 MPa/2.0 sec, and 40 MPa/2.0 sec, and the lens molded from the material of Ex. 1 was molded at a mold temperature of 120° C., a cylinder temperature of 310° C., and a holding pressure and time sequence of 80 MPa/0.8 sec, 50 MPa/2.0 sec, and 40 MPa/2.0 sec.) resulted in acceptable replicability for lenses prepared from both materials (OQ-PC of CEx. 1 and PAE-PC-1 of Ex. 1). The lens form (replication, and deviation from the required dimensions) was within the specifications, meaning that the precision dimension for each lens was within the 400 nm reference line for overall tolerance. FIG. 3A shows the surface profile of a lens fabricated using the OQ-PC of CEx. 1; FIG. 3B shows the surface profile of a lens fabricated using the PAE-PC-1 of Ex. 1. It can be seen in FIG. 3A that lenses prepared from each composition shows surface variation that is within a 400 nm (0.4 micrometer) overall tolerance.

Figures 4A, 4B:
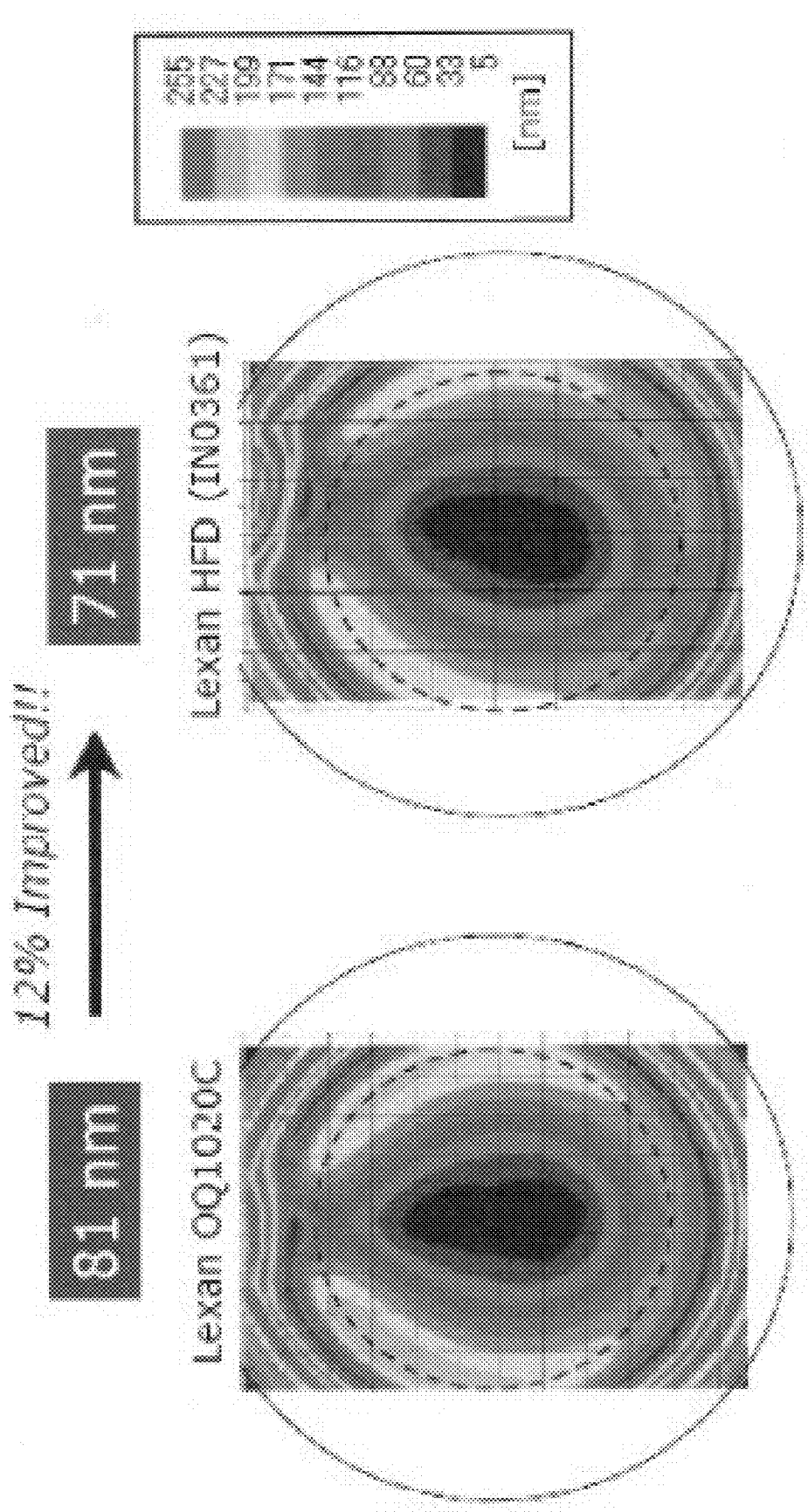
FIG. 4 shows birefringence color contour maps of (A) a lens prepared using a polycarbonate, and (B) for a lens prepared using a poly(aliphatic ester)-polycarbonate.

Measurement of birefringence. Birefringence was measured for lenses molded from the materials of CEx. 1 and Ex. 1. The lens molded from the material of CEx. 1 was molded at a mold temperature of 135° C., a cylinder temperature of 330° C., and a holding pressure and time sequence of 80 MPa/0.8 sec, 50 MPa/2.0 sec, and 40 MPa/2.0 sec. The lens molded from the material of Ex. 1 was molded at a mold temperature of 120° C., a cylinder temperature of 310° C., and a holding pressure and time sequence of 80 MPa/0.8 sec, 50 MPa/2.0 sec, and 40 MPa/2.0 sec. Birefringence for exemplary lenses (i.e., within the tolerances set by the 400 nm reference line) was measured using an Oji Instruments Kobra-CCD automatic birefringence analyzer operating at a wavelength of 590 nm. FIG. 4 shows a comparison of the results from birefringence measurement. In FIG. 4A, it can be seen in the region under the dashed line that there is a greater contour corresponding to a higher degree of birefringence, when compared to the area under the dashed line in FIG. 4B. The average calculated birefringence for the OQ-PC lens (CEx. 1) is 81 nm, which is 10 nm greater than the average retardation for the PAE-PC-1 (Ex. 1) lens of 71 nm seen in FIG. 4B. Birefringence of lenses prepared from PAE-PC-1 thereby shows dramatic improvement relative to OQ-PC.

Heat and Humidity Testing. Samples of the molded lenses prepared from Ex. 1 and CEx. 1 were exposed to conditions of 85% relative humidity at 85° C. for about 1,000 hours. Optical properties of the lenses, including percent light transmittance and percent haze were then measured. It was found that after 1,000 hours, less than a 1% reduction in percent transmittance was observed for all visible wavelengths, and the observed percent haze values for the samples so tested remained less than 1%, for the Ex. 1.

Comparative Examples 2-4, and Examples 2-18. Poly(aliphatic ester)-polycarbonate copolymers with suitable melt flow and optical properties were prepared from unsuitable or less-than-optimal higher molecular weight, high viscosity materials, (e.g., where the haze is too high, or where the MVR is at the low margin), by subjecting such materials to extrusion conditions in the presence of a redistribution catalyst. PAE-PC-2, which has a higher molecular weight (Mw=19,500 g/mol) and lower MVR (13.8 cc/10 min. than PAE-PC-1 under identical measurement conditions, was modified by redistribution under identical extrusion and molding conditions, except that the mold temperature for the optical samples of Trial 1 (CEx. 2 and 3 and Exs. 2-10) was held at 90° C., while the mold temperature for optical samples of Trial 2 (CEx. 4 and 5, and Exs. 10-18) was held at 70° C. PAE-PC-2 was compounded with additives and a redistribution catalyst (TBPH, aqueous solution) in the proportions described for Trial 1 (Table 4) and Trial 2 (Table 5), and extruded to form the corresponding higher flow poly(aliphatic ester)-polycarbonate copolymer. The properties of the resulting redistributed PAE-PC under these extrusion conditions are shown in Tables 4 and 5, below.

TABLE 4

|  | CEx 2 | CEx 3 | Ex. 2 | Ex. 3 | Ex. 4 | Ex. 5 | Ex. 6 | Ex. 7 | Ex. 8 | Ex. 9 | Ex. 10 |
| --- | --- | --- | --- | --- | --- | --- | --- | --- | --- | --- | --- |
| PAE-PC-2 (wt %) | 99.94 | 99.94 | 94.94 | 92.44 | 89.94 | 87.44 | 84.94 | 82.44 | 79.94 | 69.94 | 49.94 |
| GMS (wt %) | 0.04 | 0.04 | 0.04 | 0.04 | 0.04 | 0.04 | 0.04 | 0.04 | 0.04 | 0.04 | 0.04 |
| Stabilizer (wt %) | 0.02 | 0.02 | 0.02 | 0.02 | 0.02 | 0.02 | 0.02 | 0.02 | 0.02 | 0.02 | 0.02 |
| 40% TBPH (1:2000 w/w dilution; wt %) | 0 | 0 | 5 | 7.5 | 10 | 12.5 | 15 | 17.5 | 20 | 30 | 50 |
| ppm TBPH (ppm by weight) | 0 | 0 | 10 | 15 | 20 | 25 | 30 | 35 | 40 | 60 | 100 |
| Optical Data - 3.2 mm molded plaques |  |  |  |  |  |  |  |  |  |  |  |
| L | 95.733 | 95.773 | 95.785 | 95.779 | 95.782 | 95.764 | 95.771 | 89.498 | 95.754 | 95.755 | 94.528 |
| a | −0.142 | −0.158 | −0.130 | −0.129 | −0.136 | −0.142 | −0.139 | −0.034 | −0.142 | −0.150 | −0.128 |
| b | 1.022 | 1.048 | 0.923 | 0.939 | 0.970 | 0.994 | 1.005 | 0.667 | 1.024 | 1.075 | 1.160 |
| T 420 nm (%) | 86.972 | 86.957 | 87.340 | 87.260 | 87.211 | 87.114 | 87.099 | 73.957 | 87.001 | 86.876 | 83.871 |
| Transmission (%) | 90.9 | 91.1 | 91.1 | 91.1 | 91.1 | 91.0 | 91.1 | 91.1 | 91.0 | 91.0 | 88.7 |
| Haze (%) | 1.57 | 0.65 | 1.15 | 0.74 | 0.82 | 0.85 | 0.68 | 0.79 | 0.96 | 0.76 | 1.58 |
| Yellowness Index (YI) | 2.042 | 2.072 | 1.869 | 1.898 | 1.95 | 1.99 | 2.013 | 1.554 | 2.045 | 2.133 | 2.335 |
| Optical Data - 2.5 mm molded plaques |  |  |  |  |  |  |  |  |  |  |  |
| L | 95.793 | 95.845 | 95.856 | 95.825 | 95.848 | 95.831 | 95.823 | 95.834 | 95.827 | 95.820 | 95.764 |
| a | −0.117 | −0.132 | −0.108 | −0.116 | −0.113 | −0.121 | −0.127 | −0.121 | −0.125 | −0.129 | −0.135 |
| b | 0.875 | 0.879 | 0.787 | 0.832 | 0.817 | 0.846 | 0.871 | 0.876 | 0.875 | 0.928 | 0.990 |
| T 420 nm (%) | 87.493 | 87.549 | 87.847 | 87.628 | 87.749 | 87.635 | 87.562 | 87.543 | 87.550 | 87.399 | 87.114 |
| Transmission (%) | 91.1 | 91.2 | 91.2 | 91.2 | 91.2 | 91.2 | 91.2 | 91.2 | 91.2 | 91.1 | 91.1 |
| Haze (%) | 1.05 | 0.64 | 0.67 | 0.66 | 0.55 | 0.60 | 0.65 | 0.51 | 0.66 | 0.48 | 0.59 |
| Yellowness Index (YI) | 1.792 | 1.783 | 1.634 | 1.711 | 1.686 | 1.733 | 1.775 | 1.788 | 1.784 | 1.878 | 1.99 |
| Vicat Softening Temperature (° C.) | 125.8 | 127.0 | 125.3 | 125.2 | 126.4 | 125.1 | 126.1 | 126.2 | 125.6 | 125.7 | 125.4 |
| MVR 250° C./1.2 kg/4 min dwell (cc/10 min)[a] | 13.76 |  | 14.35 | 14.92 | 15.56 | 15.51 | 14.91 | 14.94 | 14.74 | 15.54 | 20.09 |
| Mw | 19513 | 19766 | 19610 | 19480 | 19373 | 19566 | 19653 | 19553 | 19720 | 19923 | 18660 |
| Mn | 7413 | 7419 | 7508 | 7450 | 7568 | 7588 | 7800 | 7818 | 7944 | 8378 | 8332 |
| PD | 2.63 | 2.66 | 2.61 | 2.61 | 2.56 | 2.58 | 2.52 | 2.50 | 2.48 | 2.38 | 2.24 |

[a]MVR measured according to ISO 1133.

TABLE 5

| Name | CEx[4] | Ex. 11 | Ex. 12 | Ex. 13 | Ex. 14 | Ex. 15 | Ex. 16 | Ex. 17 | Ex. 18[a] |
|---|---|---|---|---|---|---|---|---|---|
| PAE-PC-2 (wt %) | 99.94 | 93.69 | 87.44 | 79.94 | 74.94 | 69.94 | 59.94 | 49.94 | 74.94 |
| GMS (wt %) | 0.04 | 0.04 | 0.04 | 0.04 | 0.04 | 0.04 | 0.04 | 0.04 | 0.04 |
| Stabilizer (wt %) | 0.02 | 0.02 | 0.02 | 0.02 | 0.02 | 0.02 | 0.02 | 0.02 | 0.02 |
| 40% TBPH (1:1000 w/w dilution; wt %) | 0 | 6.25 | 12.5 | 20 | 25 | 30 | 40 | 50 | 25 |
| ppm TBPH (ppm by weight) | 0 | 25 | 50 | 80 | 100 | 120 | 160 | 200 | 100 |
| Torque (%) | 46 | 44 | 43 | 41 | 40 | 39 | 36 | 33 | 40 |
| Optical Data - 3.2 mm molded plaques | | | | | | | | | |
| L | 95.794 | 95.793 | 95.745 | 95.733 | 95.489 | 95.725 | 95.658 | | 95.763 |
| a | −0.141 | −0.129 | −0.144 | −0.148 | −0.149 | −0.152 | −0.156 | | −0.158 |
| b | 1.005 | 0.979 | 1.107 | 1.149 | 1.202 | 1.218 | 1.307 | | 1.155 |
| T 420 nm (%) | 87.144 | 87.239 | 86.822 | 86.659 | 85.975 | 86.505 | 86.149 | | 86.724 |
| Transmission (%) | 90.9 | 90.9 | 90.8 | 90.8 | 90.2 | 90.7 | 90.5 | | 90.8 |
| Haze (%) | 0.85 | 0.51 | 0.62 | 0.65 | 0.75 | 0.45 | 0.62 | | 0.53 |
| Yellowness Index (YI) | 2.005 | 1.968 | 2.194 | 2.268 | 2.37 | 2.394 | 2.558 | | 2.27 |
| Optical Data - 2.5 mm molded plaques | | | | | | | | | |
| L | 95.824 | 95.857 | 95.839 | 95.81 | 95.791 | 95.797 | 95.793 | | 95.832 |
| a | −0.108 | −0.104 | −0.114 | −0.121 | −0.109 | −0.119 | −0.123 | | −0.128 |
| b | 0.862 | 0.863 | 0.906 | 0.988 | 0.973 | 1.047 | 1.025 | | 0.977 |
| T 420 nm (%) | 87.591 | 87.706 | 87.56 | 87.292 | 87.281 | 87.125 | 87.128 | | 87.332 |
| Transmission (%) | 90.9 | 91 | 91 | 90.9 | 90.8 | 90.9 | 90.9 | | 91 |
| Haze (%) | 0.6 | 0.52 | 0.44 | 0.58 | 0.51 | 0.47 | 0.5 | | 0.46 |
| Yellowness Index (YI) | 1.772 | 1.777 | 1.848 | 1.994 | 1.977 | 2.107 | 2.061 | | 1.967 |
| Vicat Softening Temperature (° C.) | 125.1 | 125.9 | 125.6 | 124.9 | 125.0 | 123.2 | 123.1 | | 124.5 |
| MVR 250° C./1.2 kg/4 min dwell (cc/10 min)[b] | 13.52 | 14.5 | 15.24 | 16.72 | 18.67 | 22.13 | 30.66 | 40.16 | 18.63 |
| MVR 250° C./1.2 kg/12 min dwell (cc/10 min)[b] | 13.62 | | | | | 22.09 | | | |
| Delta MVR 250° C. (%) | 0.7 | | | | | −0.2 | | | |
| MVR 250° C./1.2 kg/4 min dwell (cc/10 min)[b] | | | | | | | 104.5 | 143.1 | 87.1 |
| Mw | 19801 | 19593 | 19864 | 19335 | 18989 | 18315 | 17146 | 16348 | 19191 |
| Mn | 7543 | 7625 | 8229 | 8563 | 8511 | 8255 | 7765 | 7371 | 8472 |
| PD | 2.63 | 2.57 | 2.41 | 2.26 | 2.23 | 2.22 | 2.21 | 2.22 | 2.27 |

[a]Repeat of Ex. 18;
[b]MVR measured according to ISO 1133.

Figure 5:
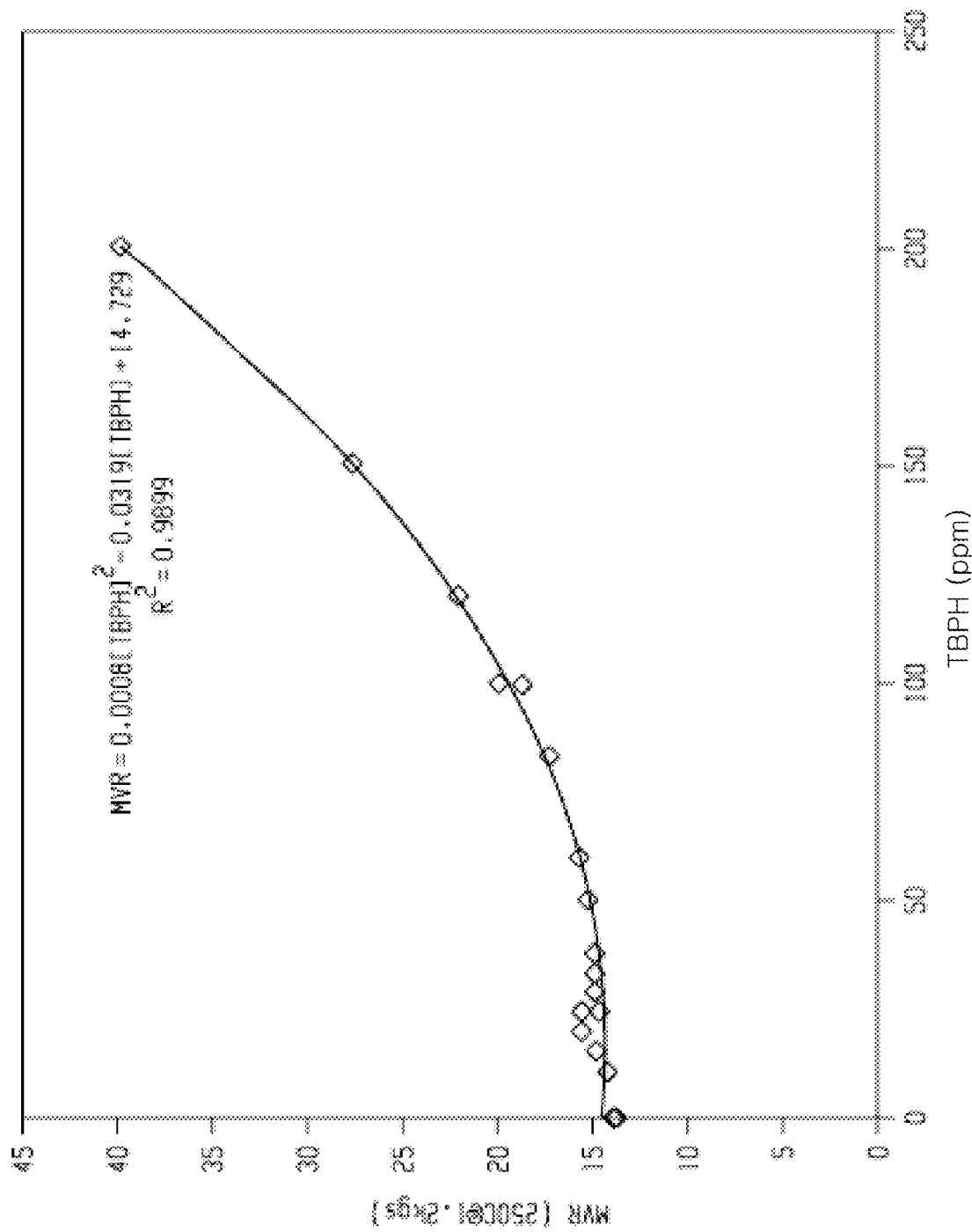
FIG. 5 shows a plot of melt-volume rate according to ISO 1133 versus loading of redistribution catalyst (ppm) for different poly(aliphatic ester)-polycarbonate compositions.

As seen in the data for each of Trials 1 and 2 (Tables 4 and 5), MVR values increased with higher loadings of TBPH. FIG. 5 shows a plot of MVR v. ppm TBPH for the combined MVR data for Trials 1 and 2, in which a nonlinear (quadratic) but consistent overall increase in MVR is seen with increasing TBPH loading for the samples. The MVR results fell within the desired range of 13 to 25 cc/10 min at 250° C./1.2 Kg for all but the highest loadings of TBPH (Ex. 16 at 160 ppm TBPH, and Ex. 17 at 200 ppm TBPH). It is believed that deviations observed in the MVR data as plotted in FIG. 5, particularly at TBPH loadings less than 50 ppm, may be attributable to variations in the MVR measurement method and variations in the redistribution process. It is understood that compounding conditions, such as use of a twin screw vs. single screw extruder, variations in extruder barrel temperature profile, and throughput (based on screw speed) can affect the redistribution efficiency and hence properties such as molecular weight and MVR of the redistributed product.

MVR values for redistribution with amounts of TBPH of greater than 120 ppm (Ex. 16 and Ex. 17) were greater than the desired maximum value of 25 cc/10 min. at 250° C./1.2 Kg. Increasing the dwell time, from 4 minutes to 12 minutes, for the redistributed PAE-PC-2 resulted in a slight decrease in MVR of −0.2% for Ex. 15, indicating a slight-to-negligible reduction in viscosity with prolonged dwell, compared to CEx. 4 (without TBPH added), which showed a slight increase in viscosity, of about 0.7%, with added dwell time. The minor change in viscosity of the redistributed PAE-PC-2 (Ex. 15) thus shows a viscosity-stable product at a temperature of 250° C. for the additional 8 minutes of dwell time (between 4 minutes and 12 minutes) indicating that the TBPH catalyst decomposed during the compounding process.

Figure 6:
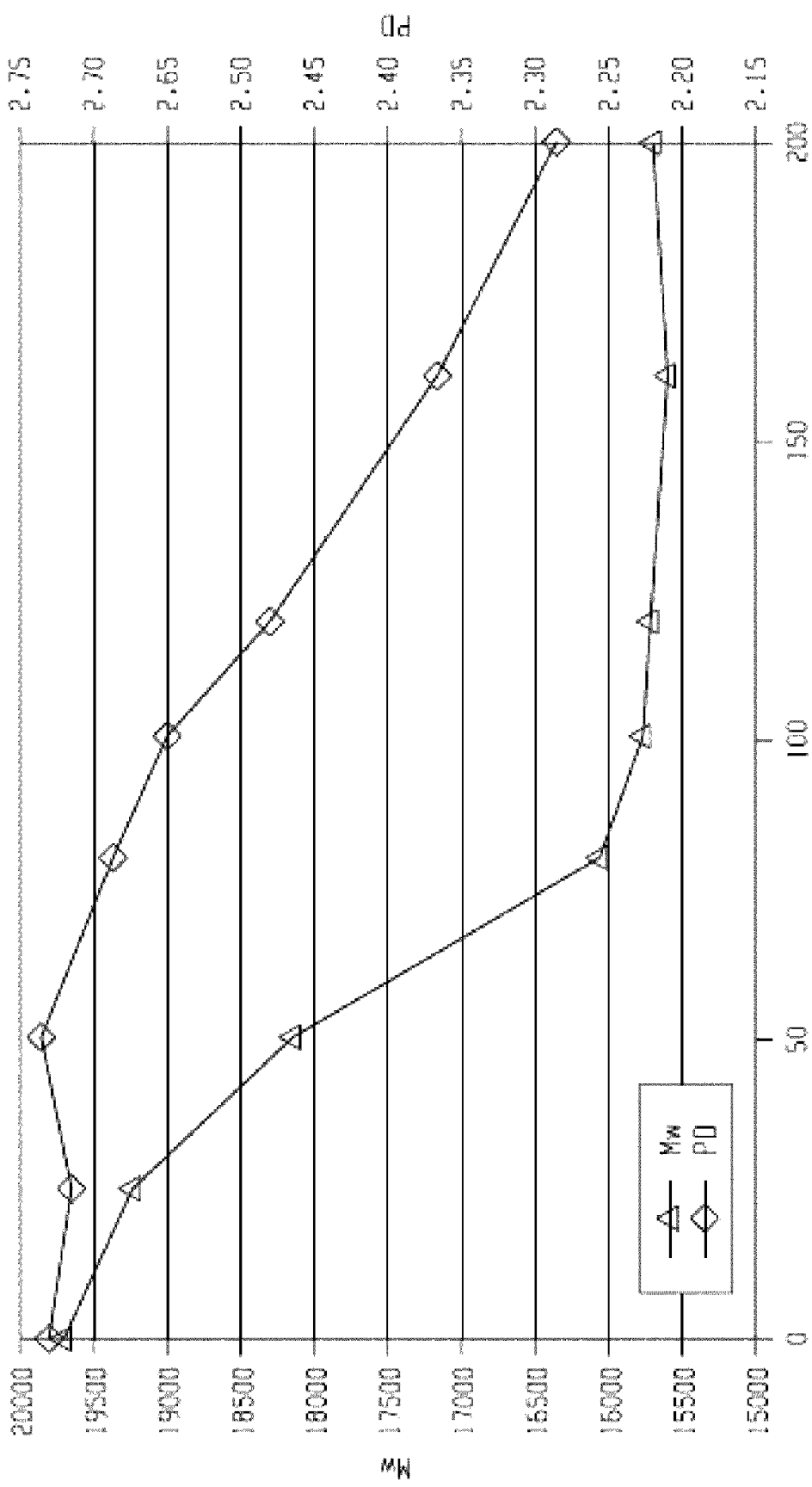
FIG. 6 shows a plot of weight-average molecular weight and polydispersity versus loading of redistribution catalyst (ppm) for different poly(aliphatic ester)-polycarbonate compositions.

The remaining data shown in Tables 4 and 5, including MVR, Vicat softening, optical data at 3.2 and 2.5 mm plaque thicknesses (i.e., % T, haze, and YI), and molecular weight, were all within acceptable limits. FIG. 6 shows a plot of weight average molecular weight (Mw) and polydispersity (PD) versus ppm TBPH catalyst. In this plot, it can be seen that the decrease in Mw is approximately inversely proportional and linear with increasing TBPH catalyst loading, and that the redistributed product approaches a constant polydispersity of between 2.20 and 2.25 at a catalyst loading of 75 ppm or greater. During molding of samples at the mold temperature of 70° C. (Trial 2, Table 5), the molded samples were observed to break at the sprue, for materials prepared with 100 to 120 ppm of TBPH or higher (i.e., beginning about Ex. 14).

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

We claim:

1. A camera lens comprising a thermoplastic composition comprising
a poly(aliphatic ester)-polycarbonate copolymer comprising soft block ester units derived from an alpha, omega $C_{6-20}$ aliphatic dicarboxylic acid or derivative thereof, a dihydroxyaromatic compound, and a carbonate source,
wherein the thermoplastic composition has a melt volume rate of 13 to 25 cc/10 min at 250° C. and under a load of 1.2 Kg and a dwell time of 6 minutes, according to ASTM D1238-04, and
wherein the camera lens has an effective lens area of 0.5 to 100 $mm^2$.

2. The camera lens of claim 1, wherein the poly(aliphatic ester)-polycarbonate copolymer has a weight average molecular weight of 16,000 to 19,000 g/mol, when measured by gel permeation chromatography using a crosslinked styrene-divinylbenzene column calibrated to polycarbonate standards.

3. The camera lens of claim 1, wherein the poly(aliphatic ester)-polycarbonate comprises 0.5 to 10 wt % soft-block ester units, based on the total weight of the poly(aliphatic ester)-polycarbonate.

4. The camera lens of claim 1, wherein the glass transition temperature of the poly(aliphatic ester)-polycarbonate is from 110 to 145° C.

5. The camera lens of claim 1, wherein the poly(aliphatic ester)-polycarbonate copolymer comprises ester units derived from an alpha, omega $C_{10-12}$ aliphatic dicarboxylic acid or derivative thereof.

6. The camera lens of claim 1, wherein the alpha, omega $C_{6-20}$ aliphatic dicarboxylic acid comprises sebacic acid, and the dihydroxyaromatic compound comprises bisphenol A.

7. The camera lens of claim 1, wherein the thermoplastic composition when molded into an article having a thickness of 3.2 mm, has a haze of less than or equal to 1.0 percent, when measured according to ASTM D1003-00.

8. The camera lens of claim 1, wherein the thermoplastic composition when molded into an article having a thickness of 3.2 mm, has a transmittance of greater than or equal to 85 percent, when measured according to ASTM D1003-00.

9. The camera lens of claim 1, wherein the thermoplastic composition, when molded into an article having a thickness of 3.2 mm, has a yellowness index (YI) of less than 4, when measured according to ASTM D1925-70.

10. The camera lens of claim 1, the thermoplastic composition further comprising a polycarbonate.

11. The camera lens of claim 10, wherein the thermoplastic composition comprises 50 to 99 wt % poly(aliphatic ester)-polycarbonate, and 1 to 50 wt % polycarbonate, based on the total weight of poly(aliphatic ester)-polycarbonate and any added polycarbonate.

12. The camera lens of claim 1, having an effective lens area of 5 to 100 $mm^2$.

13. The camera lens of claim 1, having an effective lens area of 0.5 to 10 $mm^2$.

14. The camera lens of claim 1, wherein the camera lens thickness is from 0.25 to 2.5 mm.

15. The camera lens of claim 1, wherein the camera lens is a spherical or aspherical lens having a focal point.

16. The camera lens of claim 15, wherein the spherical lens is a double-convex lens, double-concave lens, plano-convex lens, plano-concave lens, meniscus convex lens or meniscus concave lens.

17. The camera lens of claim 15, wherein the aspherical lens has an ellipsoidal, hyperbolic, or parabolic face.

18. An optical lens having a shaped surface, comprising a thermoplastic composition comprising:
a) a first polymer that is a poly(aliphatic ester)-polycarbonate copolymer comprising soft block ester units of the formula (8a)

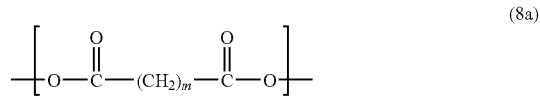

wherein m is 4 to 18; and
b) optionally, a second polymer that is a polycarbonate,
wherein the thermoplastic composition has a melt volume rate of 13 cc/10 min to 25 cc/10 min at 250° C. and under a load of 1.2Kg and a dwell time of 6 minutes, according to ASTM D1238-04,
wherein an article molded from the thermoplastic composition and having a thickness of 3.2 mm has a haze of less than or equal to 1.0 percent, when measured according to ASTM D1003-00, and
wherein the camera lens has an effective lens area of 0.5 to 100 $mm^2$.

19. A method of making a camera lens, comprising
molding a poly(aliphatic ester)-polycarbonate copolymer comprising soft block ester units derived from an alpha, omega $C_{6-20}$ aliphatic dicarboxylic acid or derivative thereof, a dihydroxyaromatic compound, and a carbonate source,
wherein the thermoplastic composition has a melt volume rate of 13 to 25 cc/10 min at 250° C. and under a load of 1.2 Kg and a dwell time of 6 minutes, according to ASTM D1238-04,
wherein the camera lens has an effective lens area of 0.5 to 100 $mm^2$, and
wherein an optical lens prepared by the method has precision dimensions that deviate by less than 400 nm from a reference standard when measured by three dimensional contact profilometry.

20. The method of claim 19, wherein successive optical lenses prepared by the method each have precision dimensions that deviate by less than 400 nm from a reference standard when measured by three dimensional contact measurement.

21. A camera lens comprising a thermoplastic composition, comprising a reaction product of a poly(aliphatic ester)-polycarbonate copolymer comprising 0.5 to 10 wt % soft block ester units derived from an alpha, omega $C_{6-20}$ aliphatic dicarboxylic acid or derivative thereof, a dihydroxyaromatic compound, and a carbonate source, with a redistribution catalyst, wherein the thermoplastic composition has a melt volume rate of 13 to 25 cc/10 min at 250° C. and under a load of 1.2 Kg and a dwell time of 4 minutes, according to ISO 1133, and wherein the camera lens has an effective lens area of 0.5 to 100 $mm^2$.

22. The camera lens of claim 21, wherein the redistribution catalyst is a tetra $C_{1-6}$ alkylphosphonium hydroxide, $C_{1-6}$ alkyl phosphonium phenoxide, or a combination comprising one or more of the foregoing catalysts.

23. The camera lens of claim 21, wherein the redistribution catalyst is present in an amount of 40 to 120 ppm.

24. The camera lens of claim 21, wherein the thermoplastic composition further comprises a poly(aliphatic ester)-polycarbonate copolymer comprising 0.5 to 10 wt % soft block ester units that has not been treated with a redistribution catalyst to form a reaction product.

* * * * *